United States Patent
DeStories et al.

(10) Patent No.: US 9,589,390 B2
(45) Date of Patent: Mar. 7, 2017

(54) WIRE HARNESS ASSEMBLY

(71) Applicant: The Boeing Company, Chicago, IL (US)

(72) Inventors: Jason Gerald DeStories, Mesa, AZ (US); Frederick C. Edman, Mesa, AZ (US); James R. Crocco, Gilbert, AZ (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/711,294

(22) Filed: May 13, 2015

(65) Prior Publication Data

US 2016/0335800 A1 Nov. 17, 2016

(51) Int. Cl.
| | |
|---|---|
| *G06T 19/00* | (2011.01) |
| *G06F 3/0484* | (2013.01) |
| *G06F 3/0488* | (2013.01) |
| *G06F 3/16* | (2006.01) |
| *G06K 9/00* | (2006.01) |
| *G02B 27/01* | (2006.01) |

(52) U.S. Cl.
CPC ........ *G06T 19/006* (2013.01); *G02B 27/0172* (2013.01); *G06F 3/04842* (2013.01); *G06F 3/04883* (2013.01); *G06F 3/167* (2013.01); *G06K 9/00671* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 5,153,839 | A * | 10/1992 | Cross | G05B 19/41835 29/33 M |
| 6,272,387 | B1 * | 8/2001 | Yoon | B60R 16/0207 700/17 |
| 6,625,299 | B1 * | 9/2003 | Meisner | G01S 5/16 348/169 |
| 7,093,351 | B2 * | 8/2006 | Kelley | H01R 9/2475 29/33 F |
| 7,507,113 | B2 * | 3/2009 | Aida | H01R 43/28 439/501 |
| 2003/0163917 | A1 * | 9/2003 | Davidshofer | B60R 16/0207 29/854 |
| 2008/0050711 | A1 * | 2/2008 | Doswell | G09B 7/02 434/350 |

(Continued)

OTHER PUBLICATIONS

Doswell, Jayfus T., M. Brian Blake, and Jerome Butcher-Green. "Mobile augmented reality system architecture for ubiquitous e-learning." Wireless, Mobile and Ubiquitous Technology in Education, 2006. WMUTE'06. Fourth IEEE International Workshop on. IEEE, 2006.*

(Continued)

*Primary Examiner* — Ryan M Gray
(74) *Attorney, Agent, or Firm* — Yee & Associates, P.C.

(57) ABSTRACT

A method and apparatus for an augmented reality vision system. A first input selecting a branch is received. Task information associated with a wire harness containing the branch is retrieved based on the first input. A second input requesting information related to inserting a wire is received. A plug map of a plug of the branch of the wire harness is generated based on the second input and using the task information associated with the wire harness. The plug map is displayed on a display system. A location of a selected wire is indicated in the plug map.

21 Claims, 18 Drawing Sheets

(56) References Cited

U.S. PATENT DOCUMENTS

| | | | |
|---|---|---|---|
| 2008/0100570 A1 | 5/2008 | Friedrich et al. | |
| 2008/0278821 A1 | 11/2008 | Rieger | |
| 2009/0265923 A1* | 10/2009 | MaClean | H01B 13/01227 29/729 |
| 2011/0076655 A1* | 3/2011 | Brosseau | G09B 19/003 434/224 |
| 2013/0100277 A1* | 4/2013 | Prieto Loefkrantz | G06T 7/0004 348/87 |

OTHER PUBLICATIONS

Ritchie, James, et al. "Immersive virtual reality as an interactive tool for cable harness design." Proceedings of PRASIC (2002): 249-255.*

Ng, F. M., J. M. Ritchie, and J. E. L. Simmons. "The design and planning of cable harness assemblies." Proceedings of the Institution of Mechanical Engineers, Part B: Journal of Engineering Manufacture 214.10 (2000): 881-890.*

Tita, "Smart Glasses Get New Look on Factory Floor," The Wall Street Journal, Jun. 2015, 5 pages, accessed Jun. 5, 2015. http://www.wsj.com/articles/smart-glasses-get-new-look-on-factory-floor-1433301177.

Broadhead et al., "Augmented Reality Maintenance System," U.S. Appl. No. 13/663,143, filed Oct. 29, 2012, p. 56.

Davis, "Boeing Selects Skylight for Smart Glasses," APX Labs, Inc., Nov. 2014, 4 pages. http://www.apx-labs.com/2014/11/04/boeing-selects-skylight-for-smad-glasses/.

Hulings, "You can see the difference," Boeing Corporation, Feb. 2015, 2 pages. http://www.boeing.com/features/2015/02/corp-google-glass-02-16-15.page.

* cited by examiner

WIRE HARNESS ASSEMBLY

BACKGROUND INFORMATION

1. Field

The present disclosure relates generally to manufacturing and, in particular, to a method and apparatus for forming wire harnesses. Still more particularly, the present disclosure relates to a method and apparatus for displaying assembly instructions for forming wire harnesses.

2. Background

A wire harness is an assembly of cables or wires that transmit signals or electricity. A wire harness may be used in aircraft, automobiles, heavy machinery, or other platforms.

Automation of production of wire harnesses may be more expensive or more difficult than desired. Production of wire harnesses may be performed manually. Instructions for producing a wire harness may include instructions regarding stripping wires, crimping wires, inserting wires into a terminal or a connector, or fastening wires together.

Currently, instructions for producing a wire harness may be in the form of paper planning packets. The paper packets must be printed. Often, the stack of paper is then sorted by technicians. Technicians must often flip through paper and reference the instructions. Referencing paper instructions may split the attention of the technician. Referencing paper instructions may also require more time than desired. Further, the paper instructions may be confusing or difficult to read. Still further, referencing paper instructions may require the technician to put down the wire harness.

Therefore, it would be desirable to have a method and apparatus that take into account at least some of the issues discussed above, as well as other possible issues.

SUMMARY

An illustrative embodiment of the present disclosure provides an augmented reality vision system for a wire harness assembly environment. The augmented reality vision system comprises a display system and a processor running a mobile application. The display system has a viewing area configured to display an image. The display system is head-mounted. The mobile application provides data regarding the wire harness. The mobile application receives a first input selecting a branch. The mobile application retrieves task information associated with the wire harness containing the branch based on the first input. The mobile application receives a second input requesting information related to inserting a wire. The mobile application generates a plug map of a plug of the branch of the wire harness based on the second input and using the task information associated with the wire harness. The mobile application displays the plug map on the display system. The mobile application indicates a location of a selected wire in the plug map.

A further illustrative embodiment of the present disclosure provides an augmented reality vision system for a wire harness assembly environment. The augmented reality vision system comprises a display system, an input device, a camera system, and a processor running a mobile application. The display system has a viewing area that is substantially transparent. The viewing area is configured to display an image. The display system takes the form of augmented reality glasses. The input device is associated with the display system. The input device is configured to receive at least one of a first input or a second input. The camera system is associated with the display system. The process is associated with the display system. The mobile application to provide data regarding the wire harness. The mobile application receives a first input selecting a branch. The mobile application retrieves task information associated with the wire harness containing the branch based on the first input. The mobile application receives a second input requesting information related to inserting a wire. The mobile application generates a plug map of a plug of the branch of the wire harness based on the second input and using the task information associated with the wire harness. The mobile application displays the plug map on the display system. The mobile application indicates a location of a selected wire in the plug map.

Another illustrative embodiment of the present disclosure provides a method of displaying an image using an augmented reality vision system. A first input selecting a branch is received. Task information associated with a wire harness containing the branch is retrieved based on the first input. A second input requesting information related to inserting a wire is received. A plug map of a plug of the branch of the wire harness is generated based on the second input and using the task information associated with the wire harness. The plug map is displayed on a display system. A location of a selected wire is indicated in the plug map.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
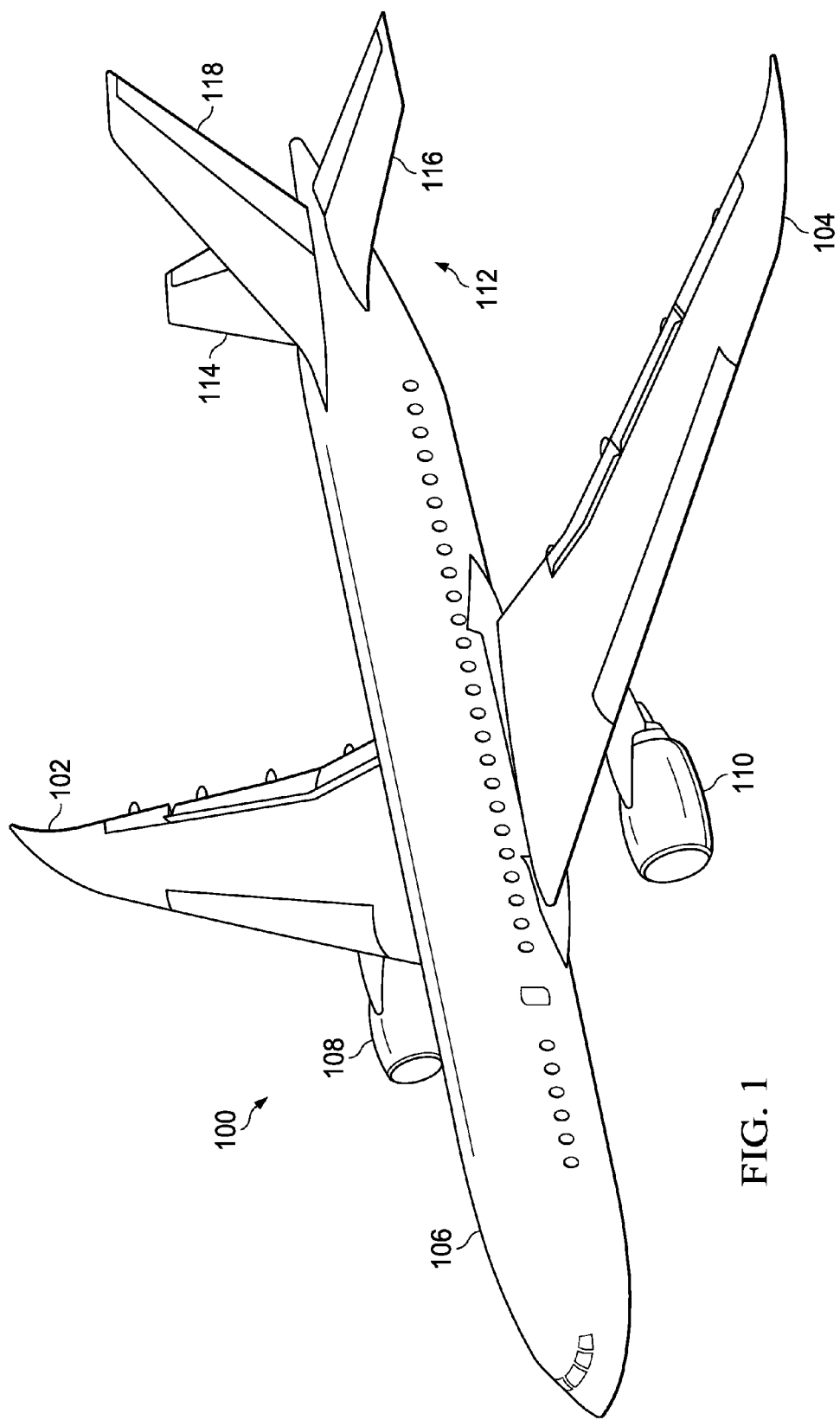
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. Aircraft 100 is an example of an aircraft which includes a wire harness. A wire harness may be assembled using display systems as disclosed herein.

Figure 19:
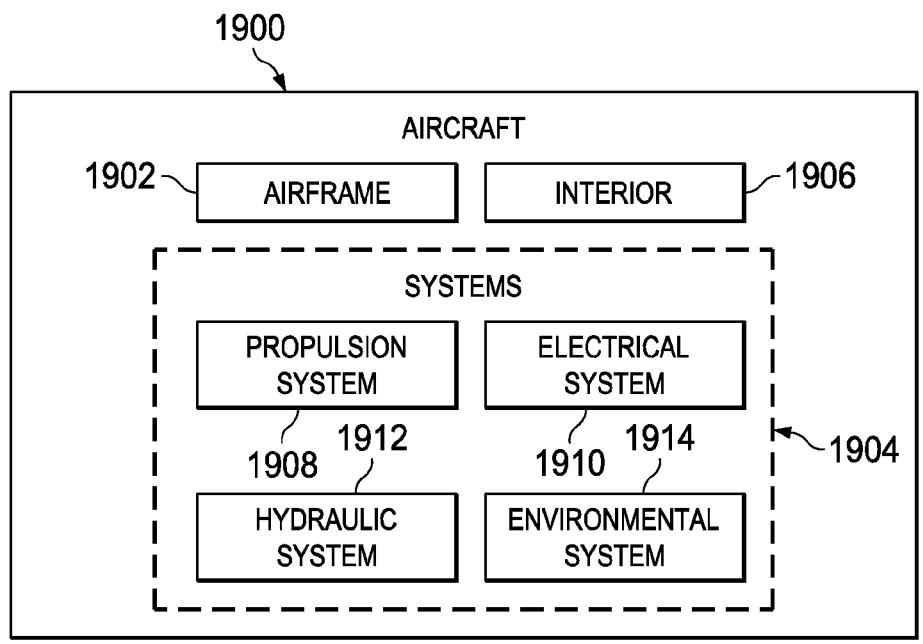
FIG. 19 is an illustration of an aircraft in which an illustrative embodiment may be implemented.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft. For example, an illustration of a block diagram of aircraft 1900 is depicted in FIG. 19.

Although the illustrative examples for an illustrative embodiment are described with respect to an aircraft, the illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a piece of manufacturing equipment, and other suitable platforms.

Figure 2:
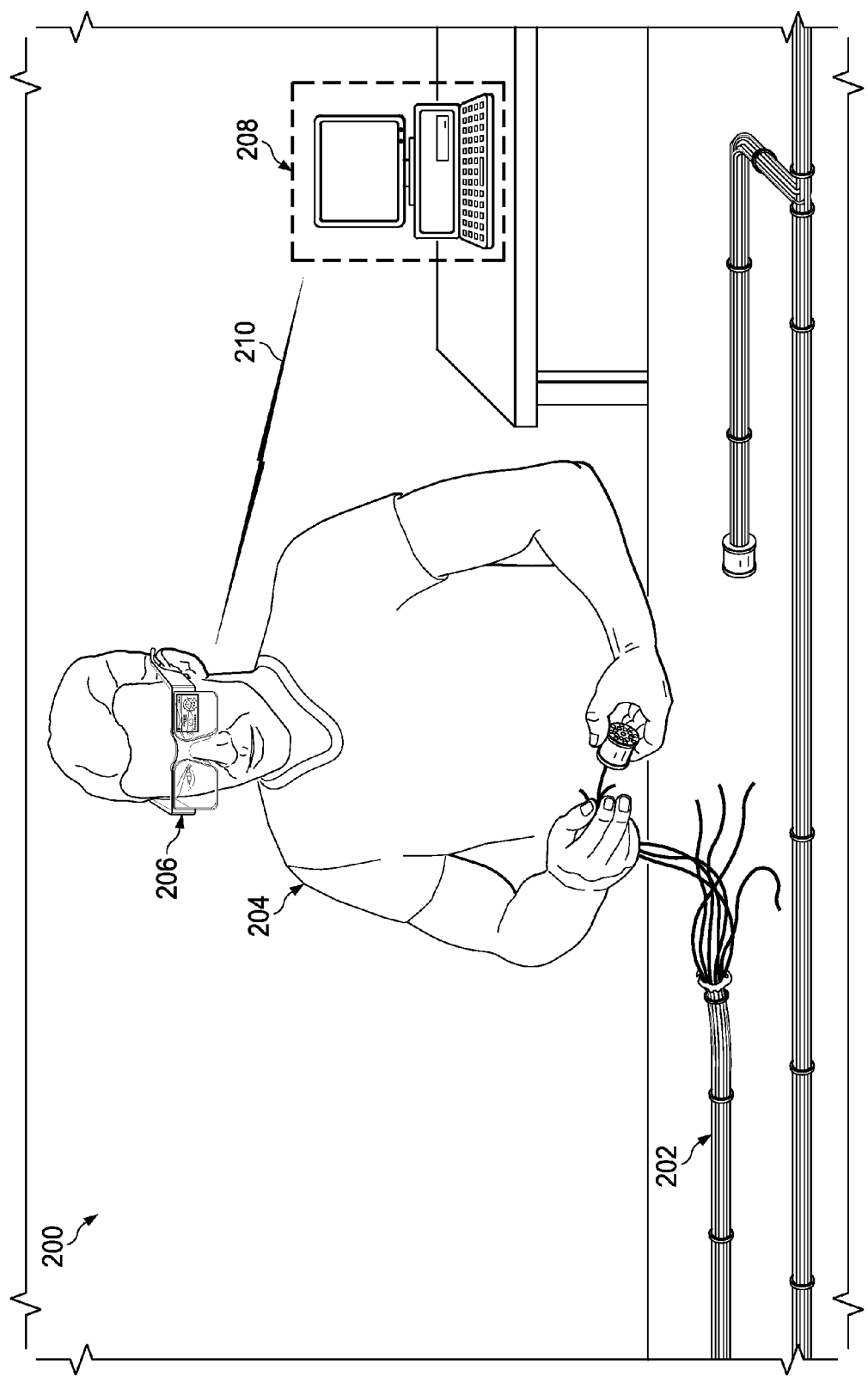
FIG. 2 is a pictorial illustration of a wire harness assembly environment in accordance with an illustrative embodiment.

Turning now to FIG. 2, a pictorial illustration of a wire harness assembly environment is depicted in accordance with an illustrative embodiment. As depicted, wire harness assembly environment 200 includes wire harness 202 and operator 204. Wire harness 202 may be used in manufacturing aircraft 100 of FIG. 1. Operator 204 may perform various tasks on wire harness 202 in these illustrative examples. In this particular example, the tasks are assembly tasks.

A task is a piece of work to be performed or undertaken. A task may be comprised of one or more operations. The tasks that may be performed on wire harness 202 may include, for example, without limitation, at least one of inserting wires, stripping wires, crimping wires, and other suitable tasks on wire harness 202.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Figure 5:
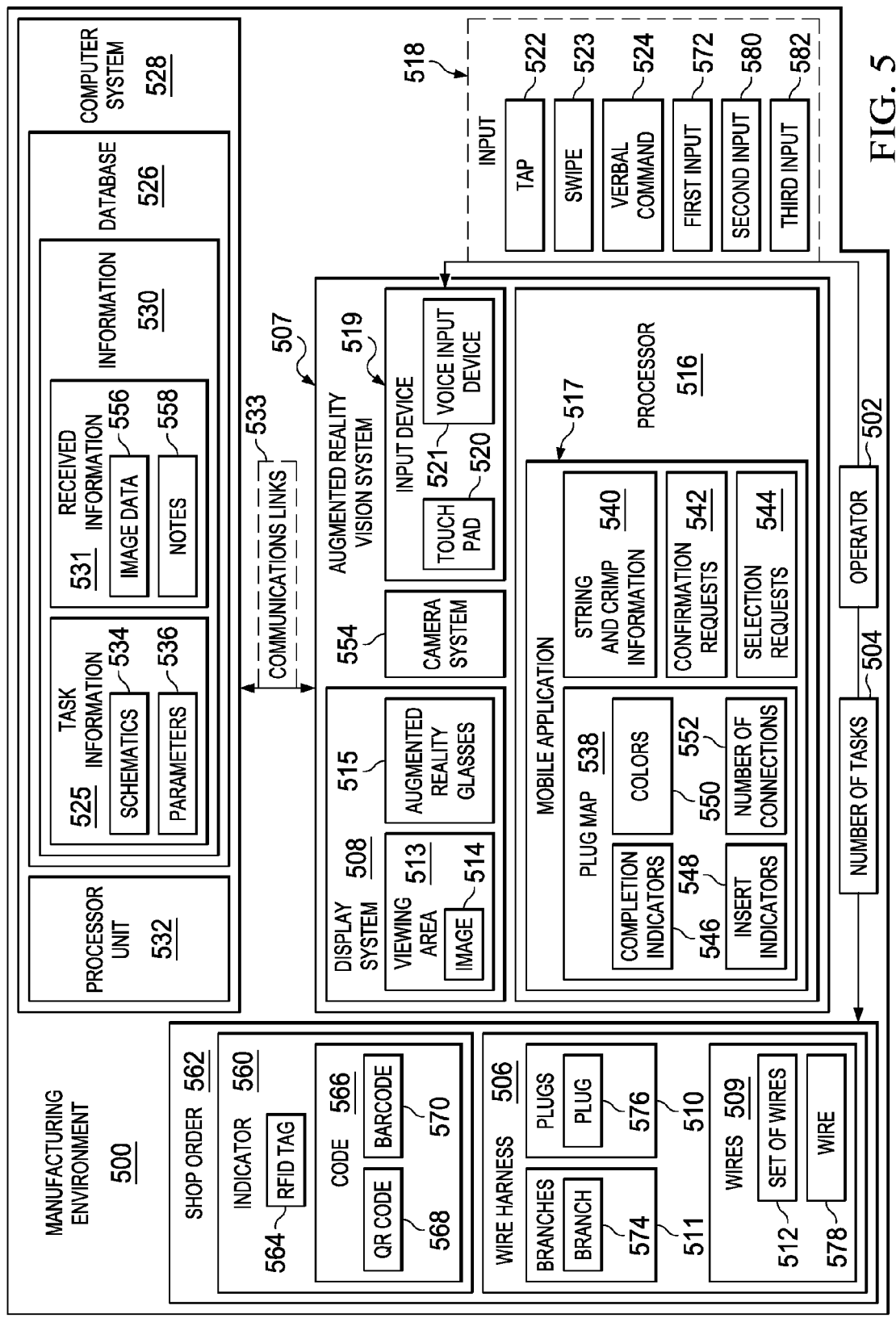
FIG. 5 is an illustration of a block diagram of a wire harness assembly environment in accordance with an illustrative embodiment.

As depicted, operator 204 has augmented reality glasses 206. Augmented reality glasses 206 may be a physical implementation of a display system, such as display system 508 of FIG. 5. In these illustrative examples, augmented reality glasses 206 used by operator 204 allow operator 204 to see the information as well as different objects in wire harness assembly environment 200 around operator 204. In other words, the display of information on augmented reality glasses 206 is such that operator 204 may still see objects around operator 204.

For example, operator 204 may see different parts of wire harness 202 to perform tasks on wire harness 202 while looking at instructions through augmented reality glasses 206. In these illustrative examples, augmented reality glasses 206 are configured to display instructions for assembly on augmented reality glasses 206 in a manner that also allows operator 204 to see wire harness 202 and other objects in wire harness assembly environment 200. In other words, the display of instructions does not cover all of augmented reality glasses 206 in a manner that undesirably reduces the visibility that operator 204 has for viewing wire harness assembly environment 200 to move and perform tasks on wire harness 202.

Additionally, augmented reality glasses 206 may communicate with computer 208 in wire harness assembly environment 200. The communication may be facilitated through a communications medium such as at least one of a wired cable, an optical fiber, a wireless communications link, and other suitable types of media. As depicted, augmented reality glasses 206 communicate with computer 208 using wireless communications link 210. Computer 208 may store information received from augmented reality glasses 206. Further, computer 208 also may send information to augmented reality glasses 206. For example, computer 208 may send instructions for the performance of tasks on wire harness 202.

With respect to information sent to the augmented reality glasses 206, computer 208 may send information about wire harness 202 that may be displayed on augmented reality glasses 206 that provides instructions to operator 204 for performing tasks on wire harness 202. In one illustrative example, augmented reality glasses 206 may include a camera system that creates image data of tasks performed by operator 204 on wire harness 202. This camera system may include one or more cameras. In this manner, a record may be kept for verifying various tasks performed on wire harness 202.

In some illustrative examples, images from the camera system may be analyzed in substantially real time to verify a task was completed prior to presenting additional or different information on augmented reality glasses 206. The images from the camera may be analyzed by one of a processor or a human operator. The human operator may be an engineer, a supervisor, or any desirable operator who has the knowledge to verify the performance of the tasks.

Further, augmented reality glasses 206 may send image data from the camera system to computer 208 over wireless communications link 210. The processor or the human operator may review the image data sent over wireless communications link 210.

Unlike reviewing conventional paper instructions, operator 204 may not put wire harness 202 down to view instructions on augmented reality glasses 206. Thus, operator 204 may perform different tasks on wire harness 202 in wire harness assembly environment 200 more efficiently through the use of augmented reality glasses 206.

Figure 3:
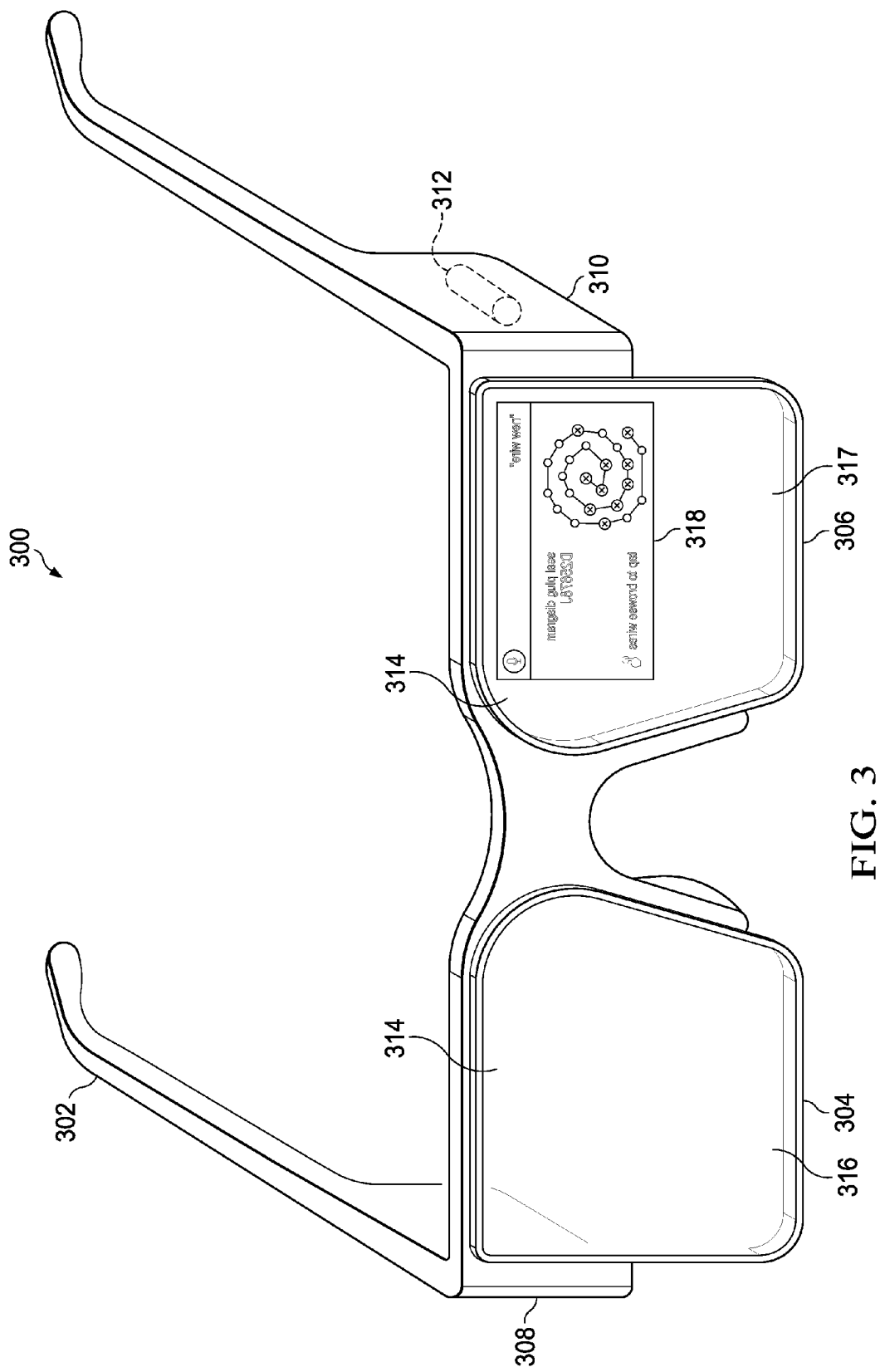
FIG. 3 is an illustration of a display system in accordance with an illustrative embodiment.

Turning now to FIG. 3, an illustration of a display system is depicted in accordance with an illustrative embodiment. In this depicted example, augmented reality glasses 300 are an example of one physical implementation for display system 508 in FIG. 5 and is a more detailed example of how augmented reality glasses 206 may be implemented in FIG. 2.

In this depicted example, augmented reality glasses 300 include frame 302, lens 304, lens 306, projector 308, projector 310, and camera 312. Lens 304 and lens 306 are associated with frame 302 of augmented reality glasses 300.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

As depicted, lens 304 and lens 306 have viewing area 314. In other words, viewing area 314 may be formed by lens 304 and lens 306. In some illustrative examples, viewing area 314 may only present in one of lens 304 and lens 306. In this type of implementation, the other lens does not display information.

Information may be displayed to an operator in viewing area 314. Viewing area 314 is a substantially transparent viewing area in these illustrative examples.

Projector 308 and projector 310 also are associated with frame 302 of augmented reality glasses 300. Projector 308 and projector 310 are configured to receive information over a wireless communications link and display the information in viewing area 314 in lens 304 and lens 306, respectively.

Projector 308 is configured to receive information over a wireless communications link and display the information in section 316 of viewing area 314 in lens 304. Projector 310 is configured to receive information over a wireless communications link and display the information in section 317 of viewing area 314 in lens 306. Of course, in other illustrative examples, projector 308 and projector 310 may be connected by a wire or optical fiber to a transceiver that is configured to receive and transmit information.

Camera 312 is also associated with frame 302 in augmented reality glasses 300. Camera 312 is configured to generate video data. Of course, camera 312 may generate still images in addition to or in place of video data. Camera 312 also may include a transmitter configured to transmit the images over a wireless communications link.

In these illustrative examples, camera 312 may be used to generate a record of operations in a task performed by an operator. Further, the video data may be viewed by an observer that may monitor and may provide assistance during the performance of the task by the operator.

In this illustrative example, image 318 is displayed in a portion of section 317 in viewing area 314 of lens 306. In this example, image 318 is a view of a user interface of a mobile application. As depicted, image 318 is displayed in viewing area 314 while the operator performs a task on a wire harness in this illustrative example. In other words, image 318 may be displayed in real-time as the operator performs a task on a wire harness.

As can be seen, the display of image 318 does not cover all of section 317 of viewing area 314 of lens 306. In this manner, an operator wearing augmented reality glasses 300 may view image 318 while performing a task on a wire harness. Image 318 is displayed in viewing area 314 in a manner that allows the operator to see other objects and the wire harness.

Of course, other types of information may be displayed in viewing area 314. In other illustrative examples, instructions, checklists, and other information may be displayed to the operator while the operator performs tasks. Further, image 318 could cover all of viewing area 314.

In some illustrative examples, augmented reality glasses may be used with other devices such as input devices. These devices may be used to input information, record notes, store data, or some combination thereof. For example, an operator may use a tablet or mobile phone to make notes for a log. Processor 516 or processor unit 532 of FIG. 5 may then use that information to generate additional instructions, alerts, or operations to be performed.

In other illustrative examples, a voice-to-text feature with a microphone in augmented reality glasses 300 may use auditory data to record operator notes. In this case, processor 516 may translate this auditory data to text form and add the data to a logbook. Of course, augmented reality glasses 300 may be used with other types of devices, depending on the particular implementation.

The illustration of augmented reality glasses 300 in FIG. 3 is not mean to limit the manner in which other augmented reality glasses may be implemented. For example, augmented reality glasses 300 may also be used to communicate with other devices or people using a communications system.

For example, augmented reality glasses 300 may include input devices such as, for example, a microphone, or other suitable input devices. Additionally, augmented reality glasses 300 may include output devices that allow an operator wearing augmented reality glasses 300 to hear communications from other devices or people. These output devices may include, for example, ear phones, ear plugs, ear buds, a headset, or some other suitable type of device.

With the use of a microphone and ear phones, augmented reality glasses 300 may allow two-way communication between devices. Of course, a communications system may be located separately from augmented reality glasses 300, depending on the particular implementation.

Figure 4:
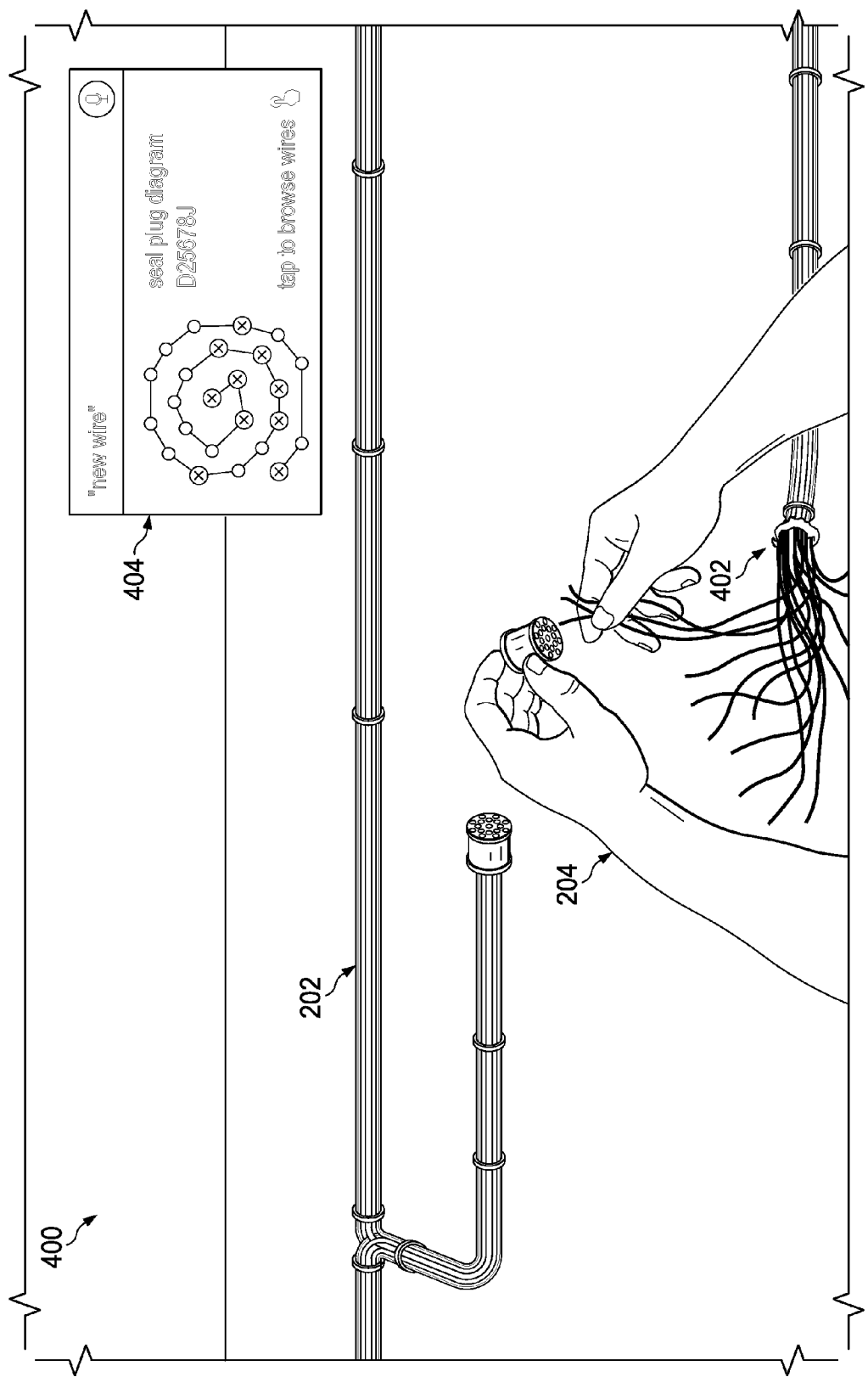
FIG. 4 is an illustration of a view using a display system in accordance with an illustrative embodiment.

Turning now to FIG. 4, an illustration of a view using a display system is depicted in accordance with an illustrative embodiment. View 400 may be a viewpoint of operator 204 of FIG. 2 within wire harness assembly environment 200 of FIG. 2 through augmented reality glasses 300 of FIG. 3. An operator can see portion 402 of wire harness 202 of FIG. 2. An operator can also see image 404. Image 404 may be a view of a user interface of a mobile application Turning now to FIG. 5, an illustration of a block diagram of a wire harness assembly environment is depicted in accordance with an illustrative embodiment. Wire harness assembly environment 200 in FIG. 2 is an example of a physical implementation of manufacturing environment 500 illustrated in block form in FIG. 5.

In some illustrative examples, manufacturing environment 500 may be referred to as a wire harness manufacturing environment or a wire harness assembly environment. In this illustrative example, operator 502 in manufacturing environment 500 may perform number of tasks 504 on wire harness 506. As used herein, a "number of," when used with reference to items, means one or more items. For example, number of tasks 504 is one or more tasks. In these illustrative examples, number of tasks 504 may be performed by operator 502 while using augmented reality vision system 507. Augmented reality vision system 507 includes display system 508.

In this illustrative example, wire harness 506 may be used in an aircraft such as aircraft 100 in FIG. 1. Wire harness 506 includes wires 509, plugs 510, and branches 511. Wire harness 506 may take a number of different forms depending on the particular implementation. For example, the number of wires 509, the number of plugs 510, the number of branches 511, the location of plugs 510, the type of plugs 510, the location of branches 511, or other aspects of wire harness 506 may vary depending on a particular implementation of wire harness 506.

Wires 509 may include set of wires 512. Set of wires 512 may be a bundle of wires that are joined together. For example, set of wires 512 may be a number of wires surrounded by the same sheath.

Branches 511 may be portions of wires 509 that extend in various directions. When wire harness 506 is in aircraft 100, branches 511 may extend to various locations of aircraft 100 of FIG. 1 to provide at least one of electricity or data. Plugs 510 may be connection points for components such as monitors, signs, or other equipment on an aircraft such as aircraft 100 of FIG. 1 to wire harness 506.

Display system 508 has viewing area 513. In these illustrative examples, viewing area 513 is a substantially transparent viewing area. In some illustrative examples, display system 508 is head-mounted. Viewing area 513 is configured to cover at least one eye of operator 502. In these illustrative examples, viewing area 513 is configured to display image 514.

As depicted, display system 508 is hardware and may include software. Display system 508 may be implemented using a number of different types of devices. For example, display system 508 may be implemented using at least one of augmented reality glasses 515, a contact lens display, or other suitable types of devices.

When display system 508 takes the form of augmented reality glasses 515, augmented reality glasses 515 may be worn by operator 502. Augmented reality glasses 515 allow operator 502 to see manufacturing environment 500 around operator 502 in addition to image 514 in these illustrative examples. Augmented reality vision system 507 may also include processor 516. Processor 516 may be implemented using software, hardware, or a combination of the two. In these illustrative examples, the hardware may take the form of a circuit system, an integrated circuit, an application-specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include a programmable logic array, programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Processor 516 may run mobile application 517. Mobile application 517 may generate image 514 for display in viewing area 513. Mobile application 517 may generate image 514 based upon input 518. Operator 502 may provide input 518 using input device 519 of augmented reality vision system 507. Input device 519 may take the form of touch pad 520, voice input device 521, or other desirable type of device. Operator 502 may provide input through tap 522, swipe 523, or other desirable types of touch on touch pad 520. In some examples, operator 502 may provide input using verbal command 524 with voice input device 521. In some illustrative examples, voice input device 521 may be a microphone.

Mobile application 517 may generate image 514 based on task information 525 of database 526. In these illustrative examples, database 526 may be located inside of computer system 528. Computer system 528 may be comprised of one or more computers. When more than one computer is present in computer system 528, those computers are operably connected to each other and may communicate using a communications medium such as a network. Database 526 may be in one location or may be distributed over multiple locations. When more than one computer is present in computer system 528, those computers may be in different geographic locations.

In this illustrative example, database 526 stores information 530. Information 530 may include task information 525 and received information 531. Task information 525 may be information that may be sent to augmented reality vision system 507 to generate image 514 using mobile application 517. Task information 525 may be selected based on input 518 received concerning wire harness 506. By using task information 525 sent by computer system 528, mobile application 517 may have the most recent information concerning tasks to be performed on wire harness 506. By receiving task information 525, mobile application 517 may have the most up-to-date information for generating image 514. As a result, operator 502 may have the most up-to-date information for performing number of tasks 504 on wire harness 506.

In these illustrative examples, processor unit 532 is configured to manage task information 525 sent to augmented reality vision system 507. For example, processor unit 532 may send task information 525 to augmented reality vision system 507 over communications links 533. Task information 525 may include schematics 534 and parameters 536. Schematics 534 may be a representation of a portion or all of wire harness 506 on which number of tasks 504 is to be performed. Parameters 536 may include factors for performing number of tasks 504. For example, parameters 536 may include at least one of gages of wires 509, tools to be used, a wire length to be stripped, or other any other desirable factors for performing number of tasks 504.

Using task information 525, mobile application 517 may generate at least one of plug map 538, strip and crimp information 540, confirmation requests 542, or selection requests 544. In some illustrative examples, image 514 may take the form of plug map 538, strip and crimp information 540, confirmation requests 542, or selection requests 544.

Plug map 538 may be an illustration of a plug to receive a number of wires. Plug map 538 may be an illustration of one of plugs 510 of wire harness 506. Plug map 538 includes completion indicators 546, insert indicators 548, colors 550, and number of connections 552. Completion indicators 546 may indicate when a wire of wires 509 is inserted into a plug of plugs 510. Completion indicators 546 may indicate which wires of wires 509 have been inserted into the plug. Completion indicators 546 may indicate completion through at least one of shading, color, icons, or other desirable form of indication. Insert indicators 548 may indicate where the next wire is to be inserted into the plug. Colors 550 may be used to indicate a variety of information. In some illustrative examples, colors 550 of plug map 538 indicate at least one of a completion state, a gauge, a type, a set, or other characteristic of wires 509 of plug map 538. Plug map 538 may also include number of connections 552. Number of connections 552 may connect representations of a number of wires in wires 509. For example, number of connections 552 may connect representations of set of wires 512.

Strip and crimp information 540 may present instructions for stripping and crimping wires 509. For example, strip and crimp information 540 may provide information regarding a length to strip of wires 509. As another example, strip and crimp information 540 may provide information for the tools to use to strip and crimp wires 509.

Confirmation requests 542 may be generated based on input 518. For example, confirmation requests 542 may confirm that operator 502 intended to provide input 518 when input 518 does not correspond to any information within mobile application 517.

Selection requests 544 may allow operator 502 to navigate to desired information. For example, selection requests 544 may allow operator 502 to navigate to plug map 538 for a desired plug in plugs 510. As another example, selection requests 544 may allow operator 502 to navigate to strip and crimp information 540 for a desired wire in wires 509. Operator 502 may select options in selection requests 544 using at least one of touch pad 520 or voice input device 521.

During performance of number of tasks 504, augmented reality vision system 507 may gather information concerning number of tasks 504. For example, camera system 554 may capture image data 556 of wire harness 506 during performance of number of tasks 504. In some illustrative examples, operator 502 may instruct camera system 554 to capture an image each time operator 502 inserts a wire of wires 509 into a plug. In other illustrative examples, operator 502 may instruct camera system 554 to take video of operator 502 performing number of tasks 504.

During performance of number of tasks 504, operator 502 may take notes 558 using augmented reality vision system 507. For example, operator 502 may record notes 558 using voice input device 521. Notes 558 and image data 556 recorded during performance of number of tasks 504 may be sent to computer system 528 using communications links 533. At least one of notes 558 or image data 556 may be consulted after forming wire harness 506 for verification of completion of number of tasks 504. Verification may be completed at any desirable time after completion of tasks 504. For example, verification may be performed the same day as completion of a task in number of tasks 504. In some other examples, verification may be performed days, weeks, months, or even years after completion of a task in number of tasks 504.

In some illustrative examples, image data 556 recorded by camera system 554 may be used to verify a task of number of tasks 504 was completed prior to presenting additional or different information in viewing area 513. In some illustrative examples, image data 556 recorded by camera system 554 may be analyzed in substantially real time to verify a task was completed prior to presenting additional or different information on augmented reality glasses 206. In some illustrative examples, image data 556 may be analyzed by at least one of processor 516 or processor unit 532. When image data 556 is analyzed by a processor such as at least one of processor 516 or processor unit 532, image data 556 may be analyzed by image analysis software. For example, image data 556 may be compared to example images of at least one of a branch, a wire, or a wire bundle having received a desired task. As another example, image data 556 may be compared to previous images of the branch to determine a difference between the previous images and image data 556. The differences may be compared to the desired task to determine if the task was completed.

In some illustrative examples, image data 556 may be sent over communications links 533 to processor unit 532 or some other desirable processor. At least one of image analysis software, a human operator, or other desirable analyzer may then analyze image data 556 sent over communications links 533.

If image data 556 indicates that a task was not completed or was completed incorrectly, mobile application 517 may generate an alert. The alert may indicate that the task should be completed or reworked.

To begin using mobile application 517, operator 502 may provide indicator 560 of shop order 562 to mobile application 517. Shop order 562 may be a set of tasks to be performed on an item. Operator 502 may either read indicator 560 aloud or scan indicator 560. Indicator 560 may be scanned using camera system 554 or an external scanner. Indicator 560 may take the form of RFID tag 564. In some examples, indicator 560 may be code 566. In some illustrative examples, code 566 may take the form of QR code 568, barcode 570, or other desirable forms of data representing codes.

By providing indicator 560 to mobile application 517, mobile application 517 may identify wire harness 506. Operator 502 may then provide first input 572 selecting branch 574 of wire harness 506. Based on at least one of first input 572 and task information 525, mobile application 517 may generate plug map 538. Plug map 538 may represent plug 576 of branch 574. Operator 502 may select wire 578 using second input 580. Mobile application 517 may generate plug map 538 such that wire 578 is a selected wire in plug map 538. Operator 502 may insert wire 578 into plug 576. Afterwards, operator 502 may provide third input 582. Third input 582 may be a request to move to a new wire, a request to take an image, or other type of request. In response to receiving third input 582, a different wire may be indicated as the selected wire in plug map 538. Each of first input 572, second input 580, and third input 582 may take the form of at least one of swipe 523, tap 522, or verbal command 524.

Figure 6:
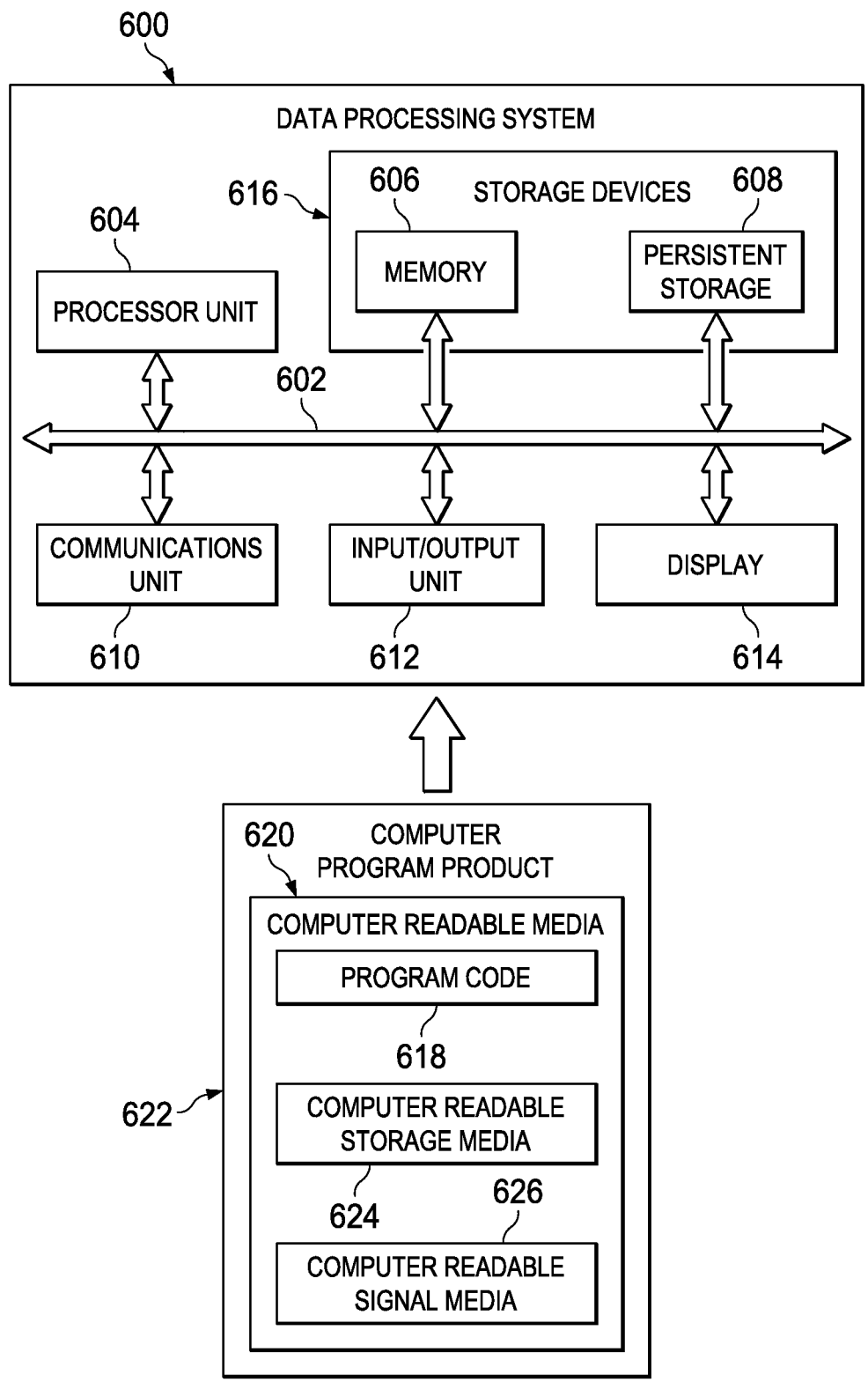
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement computer 122 in FIG. 1, computer system 216 in FIG. 2, and other suitable components. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626. In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 6 can be varied from the illustrative examples shown. The different embodiments may be implemented using any hardware device or system capable of running program code 618.

Figure 7:
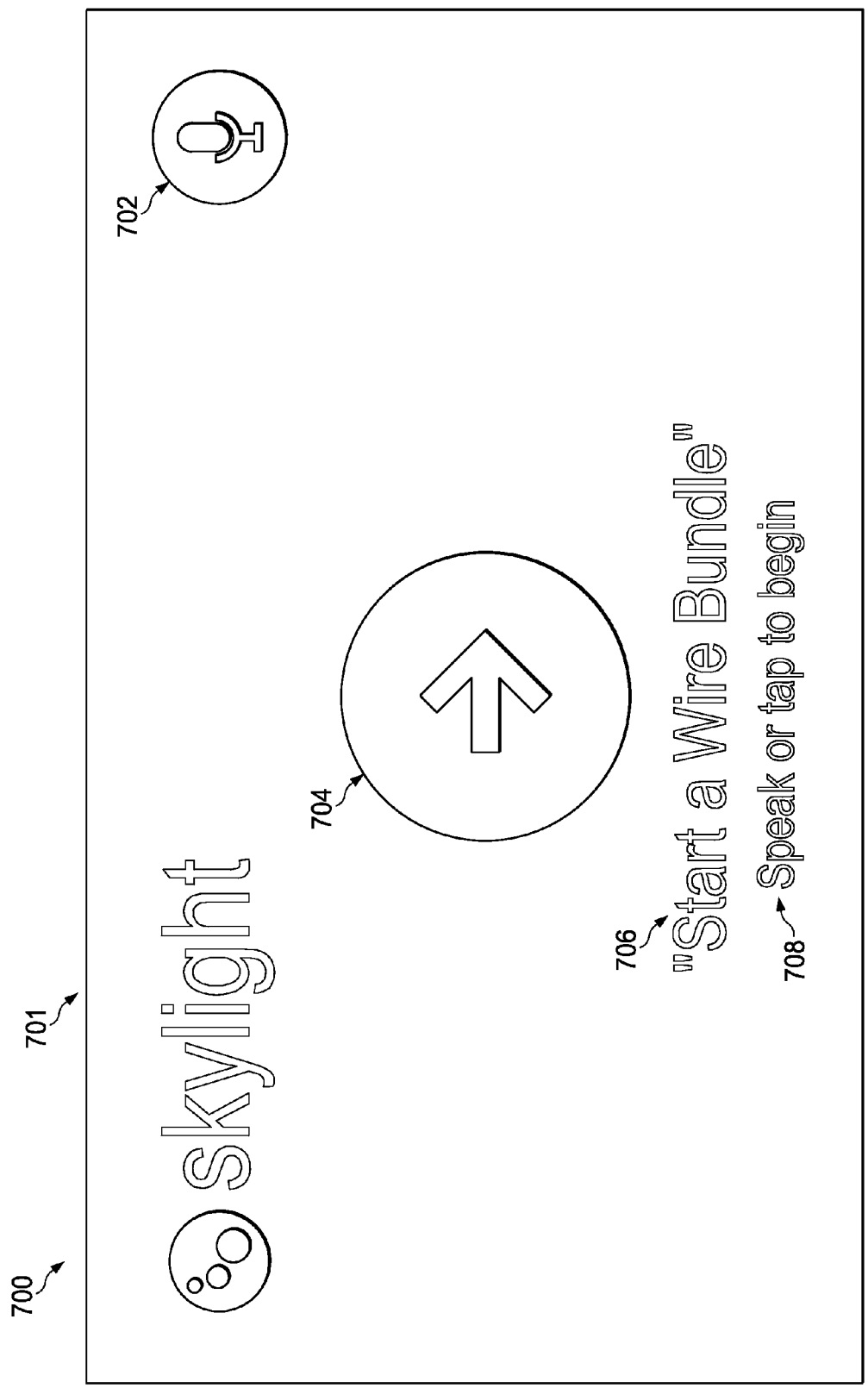
FIG. 7 is an illustration of a view of a user interface of a mobile application that could be displayed using a display system in accordance with an illustrative embodiment.

Turning now to FIG. 7, an illustration of a view of a user interface of a mobile application that could be displayed using a display system is depicted in accordance with an illustrative embodiment. View 700 may be a view of a starting image of mobile application 701. In some illustrative examples, mobile application 701 may be an example of mobile application 517 of FIG. 5. View 700 may be displayed on a display system such as display system 508 of FIG. 5. In some illustrative examples, view 700 may be displayed as an image on augmented reality glasses such as augmented reality glasses 300 of FIG. 3.

View 700 includes indicator 702, input button 704, input phrase 706, and instructions 708. Indicator 702 indicates that a voice input device, such as a microphone, is active. When a voice input device is active, voice commands may navigate within mobile application 701. Input button 704 may change to indicate input is received. For example, input button 704 may change at least one of icon, shape, color, or other features to indicate input is received. Input phrase 706 may indicate a phrase that a user should give to mobile application 701 to navigate within mobile application 701. In this illustrative example, a user may state "start a wire bundle" to navigate into mobile application 701. Instructions 708 further indicate that a user may speak or tap to navigate within mobile application 701. For example, a user may tap a touch pad on the display system to navigate into mobile application 701.

Figure 8:
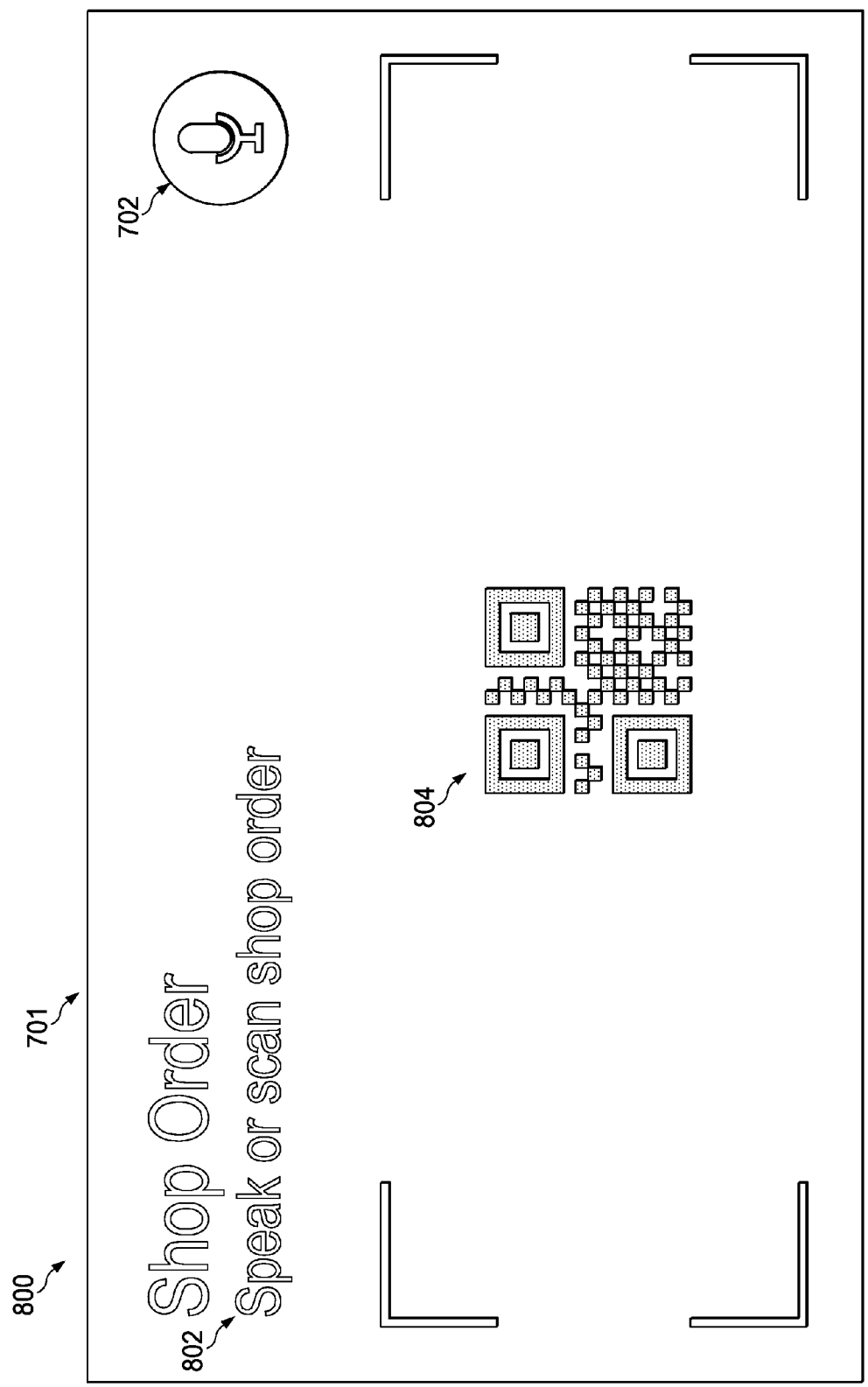
FIG. 8 is an illustration of a view of a user interface of a mobile application that could be displayed using a display system in accordance with an illustrative embodiment.

Turning now to FIG. 8, an illustration of a view of a user interface of a mobile application that could be displayed using a display system is depicted in accordance with an illustrative embodiment. View 800 may be another image of mobile application 701. View 800 includes indicator 702, instructions 802, and QR icon 804. Instructions 802 instruct operator to speak a shop order or scan the shop order. There may be a unique shop order for each wire bundle or portion of a wire bundle. For example, there may be a shop order for each plug, each branch, or certain lengths of the wire bundle. The operator may speak alpha numerical input to provide the unique shop order to mobile application 701.

QR icon 804 indicates that an operator may use an input system to scan a QR code on a shop order. Although a QR code is indicated, this input may instead be a bar code, an RFID tag, or any other desirable type of indicator. The shop order may be a printed order, an order displayed on a screen, or any other desirable method of displaying the shop order. In some illustrative examples, a camera system of the display system may capture an image of the indicator to scan the shop order. In some other examples, a separate tool, such as a handheld scanner in communication with the display system, may be used to scan the shop order.

Figure 9:
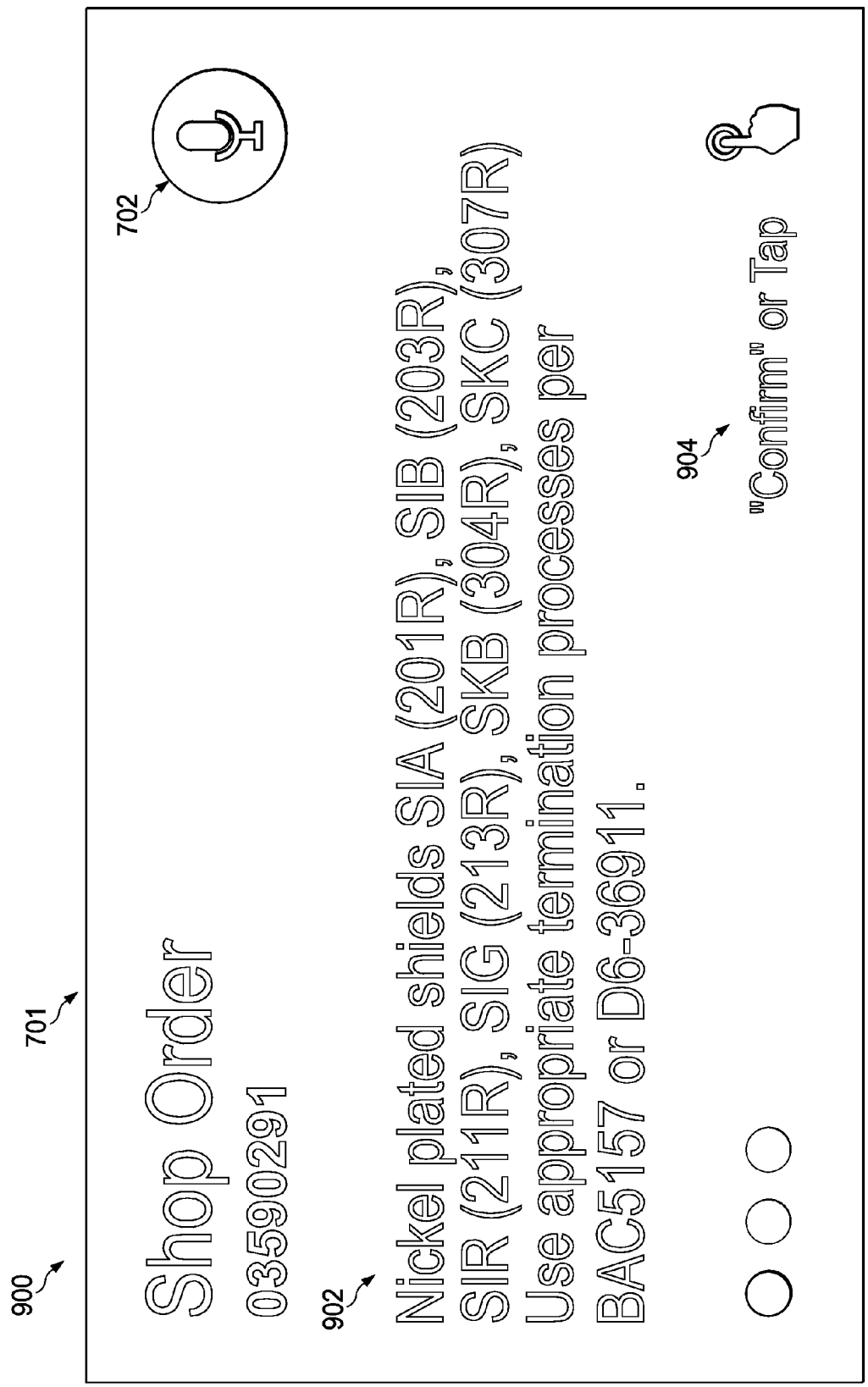
FIG. 9 is an illustration of a view of a user interface of a mobile application that could be displayed using a display system in accordance with an illustrative embodiment.

Turning now to FIG. 9, an illustration of a view of a user interface of a mobile application that could be displayed using a display system is depicted in accordance with an illustrative embodiment. View 900 may be another image of mobile application 701. View 900 may be a summary of the shop order scanned or otherwise identified in view 800 of FIG. 8. View 900 may indicate number of tasks 902 to be performed for the shop order. View 900 also includes instructions 904 to state "confirm" or tap on a touch pad. An operator may state "confirm" or tap to proceed to the next view of mobile application 701.

Figure 10:
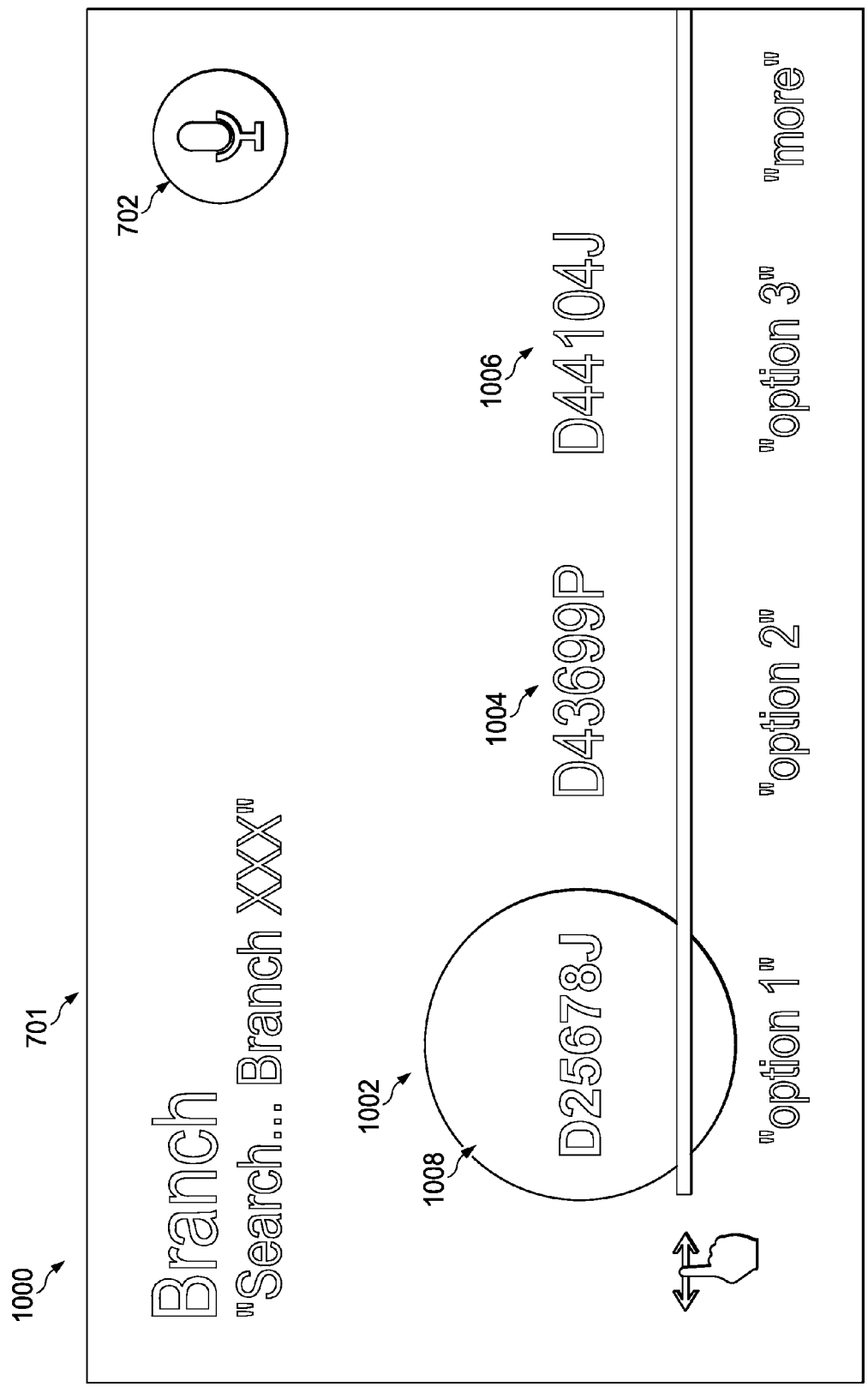
FIG. 10 is an illustration of a view of a user interface of a mobile application that could be displayed using a display system in accordance with an illustrative embodiment.

Turning now to FIG. 10, an illustration of a view of a user interface of a mobile application that could be displayed using a display system is depicted in accordance with an illustrative embodiment. View 1000 may be another image of mobile application 701. View 1000 may be navigated using voice instructions or touch instructions. As can be seen in view 1000, various branches of the shop order are displayed in alphabetical order. An operator may swipe on a touch pad of the display system to select a desired branch. For example, an operator may swipe to select first branch 1002, second branch 1004, third branch 1006, or to view more branches. Alternatively, an operator may provide alphanumeric input by speaking the name of the desired branch. Circular indicator 1008 may indicate which of first branch 1002, second branch 1004, or third branch 1006 is currently selected. As an operator scrolls through different branches, circular indicator 1008 may move within view 1000.

Figure 11:
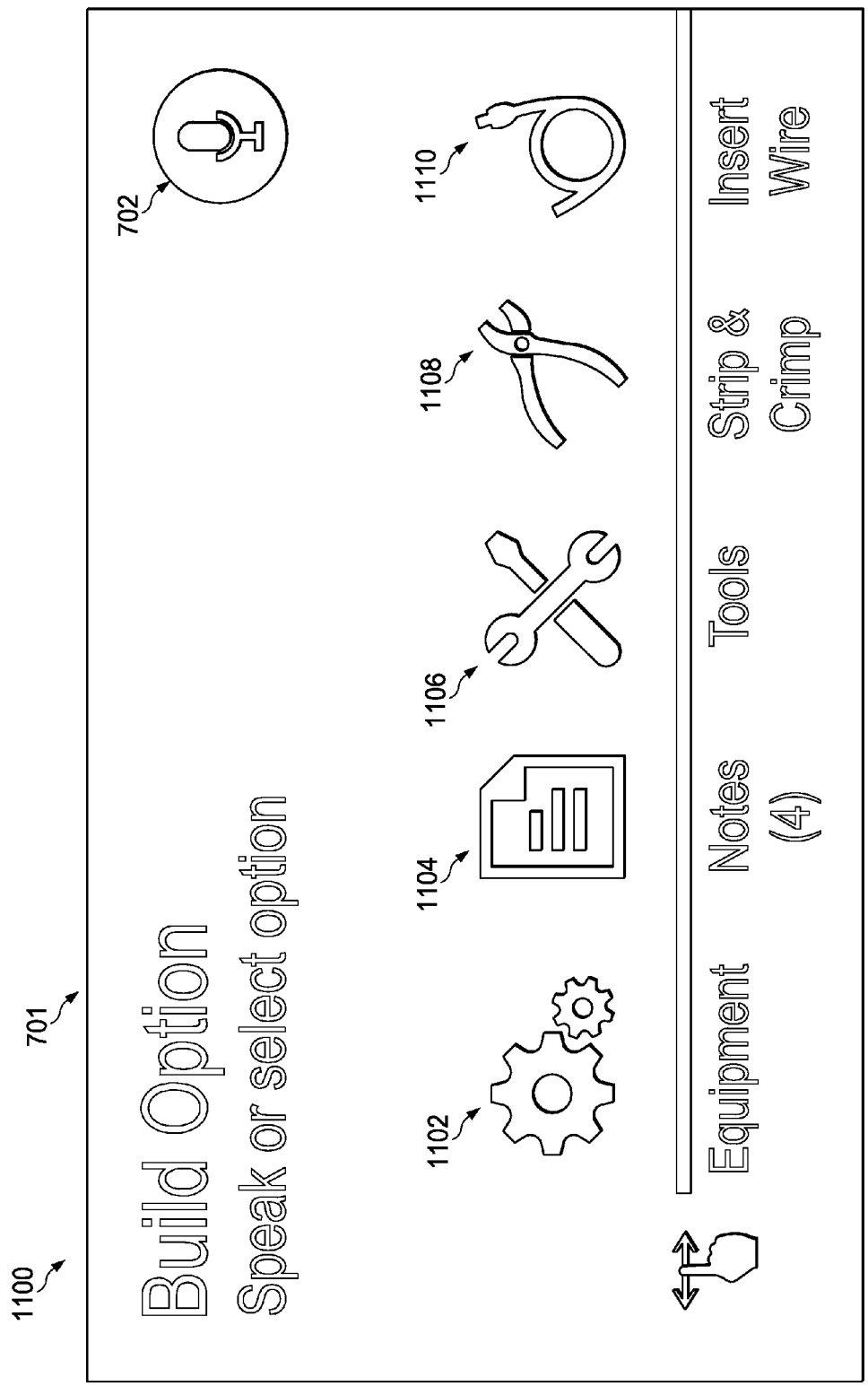
FIG. 11 is an illustration of a view of a user interface of a mobile application that could be displayed using a display system in accordance with an illustrative embodiment.

Turning now to FIG. 11, an illustration of a view of a user interface of a mobile application that could be displayed using a display system is depicted in accordance with an illustrative embodiment. View 1100 may be another image of mobile application 701. View 1100 provides an operator with a choice of different information for performing a number of tasks. For example, view 1100 includes icons for equipment 1102, notes 1104, tools 1106, strip & crimp 1108, and insert wire 1110. An operator may select a desired icon by either speaking a selection or scrolling using a touch pad of the display screen. Equipment 1102 may provide information regarding all of the parts to build the desired branch. Equipment 1102 may provide a list of parts, such as at least one of a plug, back shell, a connector clamps, or other components for building at least one of the desired branch or the harness. Notes 1104 may include instructions for building the desired branch. For example, notes 1104 may provide information for a procedure to be completed on a wire prior to moving forward. In some illustrative examples, notes 1104 may provide instructions to place a jacket over a wire to provide desirable properties. Tools 1106 may provide a list of the hand tools to build the desired branch. Hand tools may include at least one of a stripping tool, a cutting tool, a crimping tool, or any other desirable type of tool. Strip & crimp 1108 may present information for stripping and crimping each wire in the desired branch. For example, strip & crimp 1108 may provide a strip length and a type of contact pin that gets crimped to a wire. Strip length may vary depending on the type of contact pin that will be crimped to a wire. Insert wire 1110 may provide a plug map for inserting wires into a plug in the desired branch.

Figure 12:
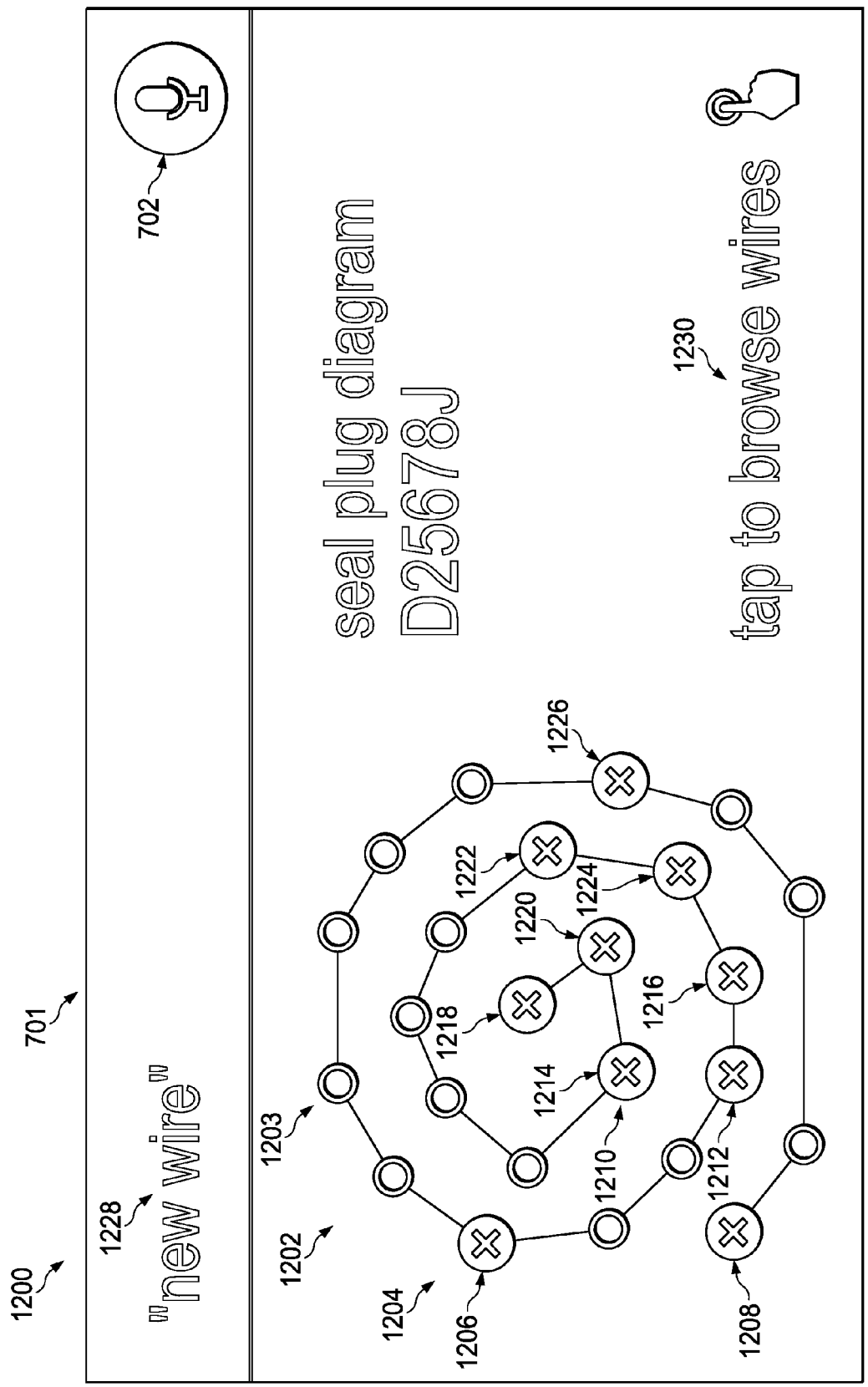
FIG. 12 is an illustration of a view of a user interface of a mobile application that could be displayed using a display system in accordance with an illustrative embodiment.

Turning now to FIG. 12, an illustration of a view of a user interface of a mobile application that could be displayed using a display system is depicted in accordance with an illustrative embodiment. View 1200 may be another image of mobile application 701. View 1200 may be an image that is displayed after selecting insert wire 1110 in view 1100. View 1200 may be an image of plug map 1202. Plug map 1202 may include openings 1203 which indicate locations of openings of a desired plug. Plug map 1202 also indicates locations 1204 of seal plugs in a plug. Seal plugs may be inserts to close off selected openings of the plug. View 1200 may be generated in response to an operator selecting insert wire 1110 in view 1100. As depicted, locations 1204 include location 1206, location 1208, location 1210, location 1212, location 1214, location 1216, location 1218, location 1220, location 1222, location 1224, and location 1226.

Information about the wires to be inserted into openings 1203 is not presented in view 1200. Commands 1228 may be spoken to progress from view 1200 within mobile application 701. For example, an operator may say "new wire" to view information regarding at least one wire in plug map 1202. Instructions 1230 instruct an operator that they may instead tap on a touch pad to view information regarding at least one wire in plug map 1202.

Figure 13:
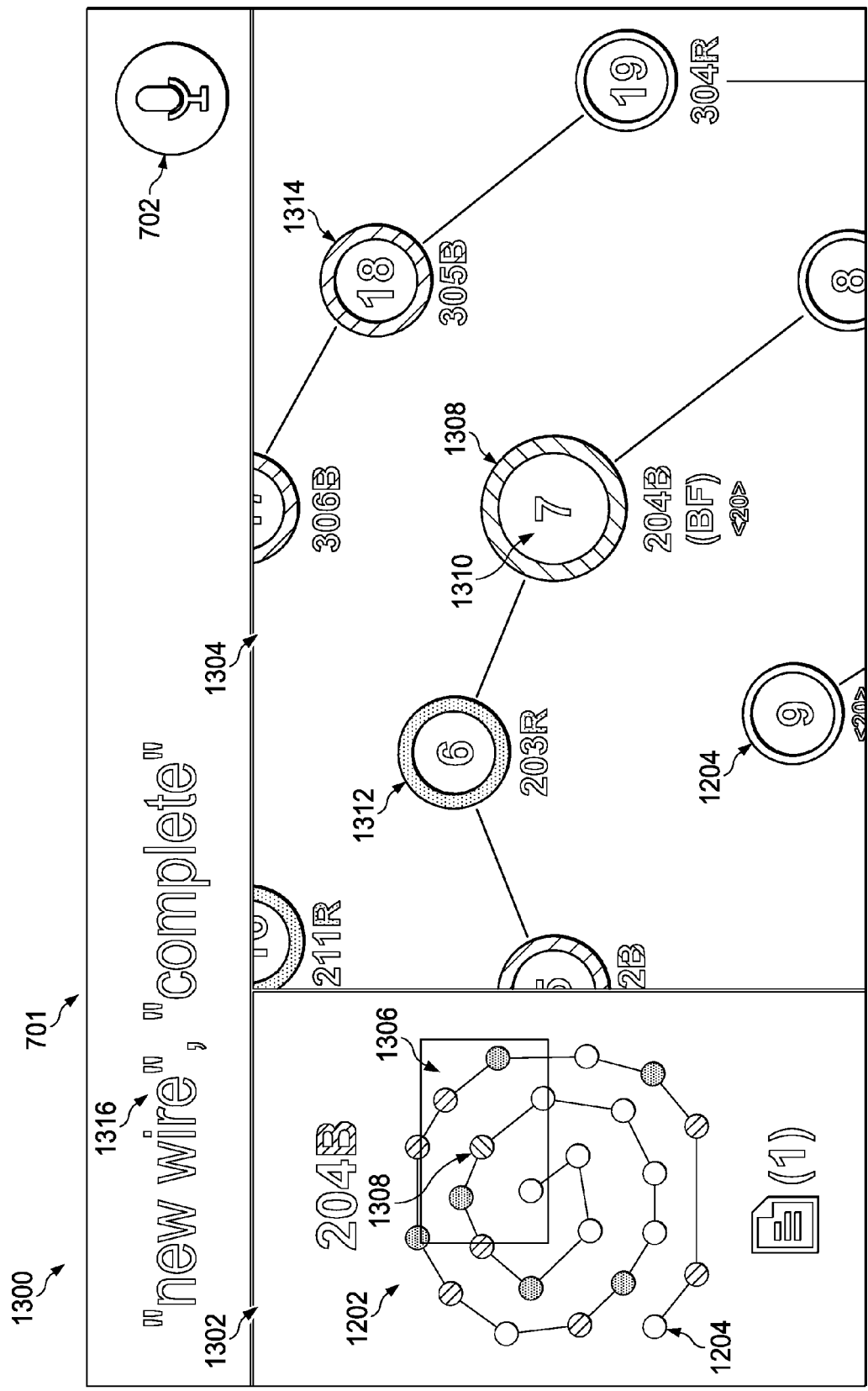
FIG. 13 is an illustration of a view of a user interface of a mobile application that could be displayed using a display system in accordance with an illustrative embodiment.

Turning now to FIG. 13, an illustration of a view of a user interface of a mobile application that could be displayed using a display system is depicted in accordance with an illustrative embodiment. View 1300 may be another image of mobile application 701. View 1300 may be an image displayed after view 1200 of FIG. 12. View 1300 may be a view of plug map 1202. In view 1300, locations 1204 of seal plugs in plug map 1202 do not have x's present. Instead, locations 1204 do not have shaded outlines. Openings 1203 which will receive wires have shaded outlines.

View 1300 is a split screen view. Plug map 1202 is present in left side 1302 of view 1300, while right side 1304 of view 1300 has a zoomed in view of portion 1306. By having right side 1304 of view 1300, an operator may more clearly see a location of selected wire 1308. The location of portion 1306 may move within plug map 1202. Specifically, the location of portion 1306 may move depending on the location of selected wire 1308. After inserting the wire indicated as selected wire 1308, portion 1306 may move to the next selected wire. As can be seen in both left side 1302 and right side 1304, selected wire 1308 is indicated using fill 1310. Only selected wire 1308 is a filled circle. After inserting a wire, selected wire 1308 may change to another wire. When selected wire 1308 changes, the filled circle also moves location with plug map 1202.

Shaded outlines of openings 1203 may indicate the type of wire that will be placed into that opening. For example, some openings of openings 1203 have first shading 1312. Other openings of openings 1203 have second shading 1314. The wires placed in openings having first shading 1312 may be different than the wires in openings having second shading 1314. In some illustrative examples, first shading 1312 and second shading 1314 may indicate at least one of different gauges, different materials, different transmission types, or other types of characteristics for wires to be inserted into the plug.

Commands 1316 may be spoken to progress from view 1300 within mobile application 701. For example, an operator may say "new wire." By saying "new wire," an operator may move which wire is selected wire 1308. An operator may say "complete." By saying "complete," mobile application 701 may move to a view to provide tasks to an operator after placing a wire into an opening.

Figure 14:
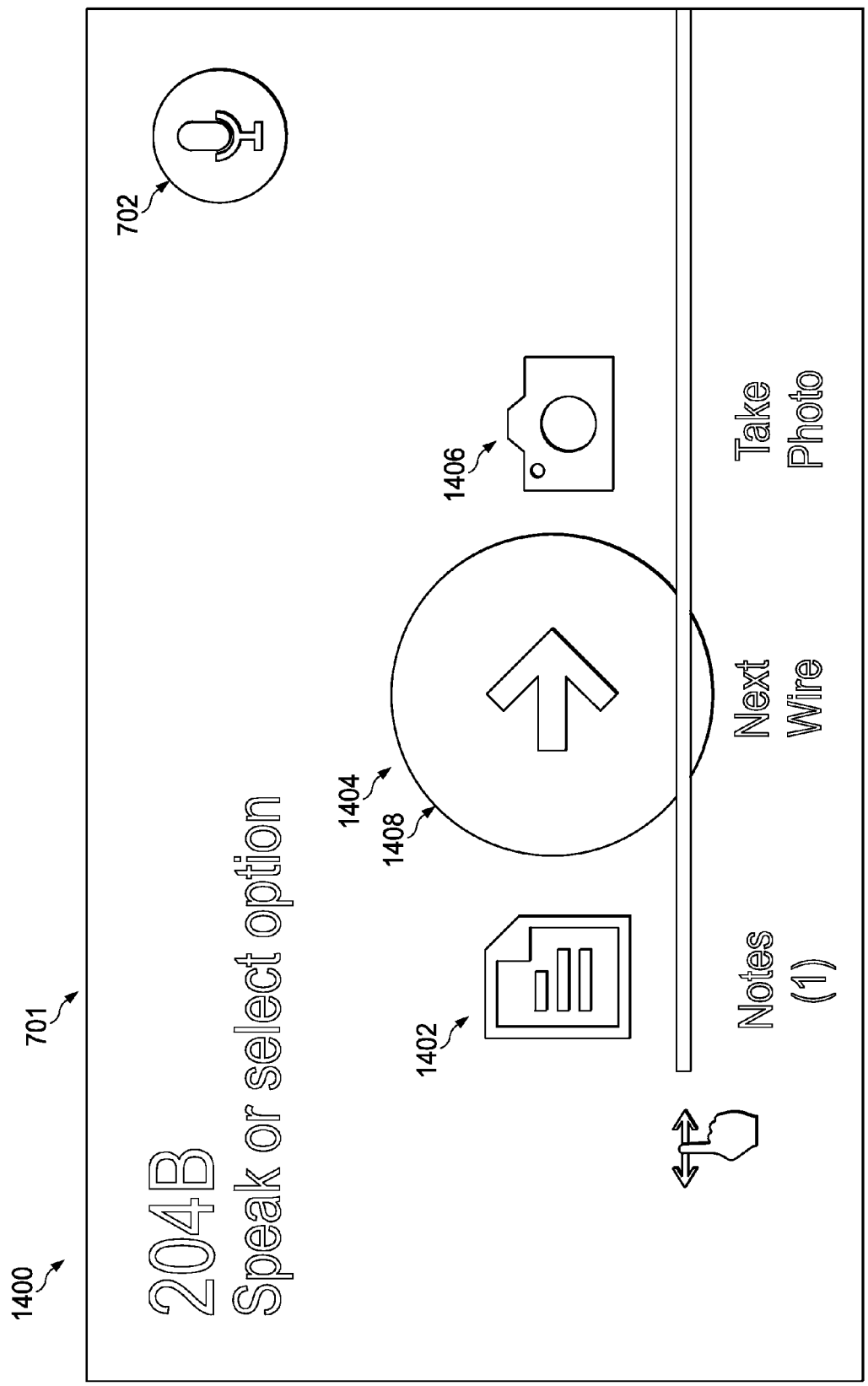
FIG. 14 is an illustration of a view of a user interface of a mobile application that could be displayed using a display system in accordance with an illustrative embodiment.

Turning now to FIG. 14, an illustration of a view of a user interface of a mobile application that could be displayed using a display system is depicted in accordance with an illustrative embodiment. View 1400 may be another image of mobile application 701. View 1400 may be displayed after view 1300. View 1400 may be a view of possible selections after inserting a wire into an opening. An operator may select notes 1402, next wire 1404, or take photo 1406. An operator may speak or scroll through the possible selections.

Circular indicator 1408 may indicate which of notes 1402, next wire 1404, or take photo 1406 is currently selected. As an operator scrolls through different selections, circular indicator 1408 may move within view 1400. By selecting notes 1402, the operator may make notes regarding the most recently finished task. By selecting next wire 1404, information regarding another wire may be displayed. If next wire 1404 is selected, a view such as view 1300 with a different selected wire 1308 may be displayed. By selecting take photo 1406, the display system may take a picture of the area that the operator is viewing such as the plug with inserted wires.

Figure 15:
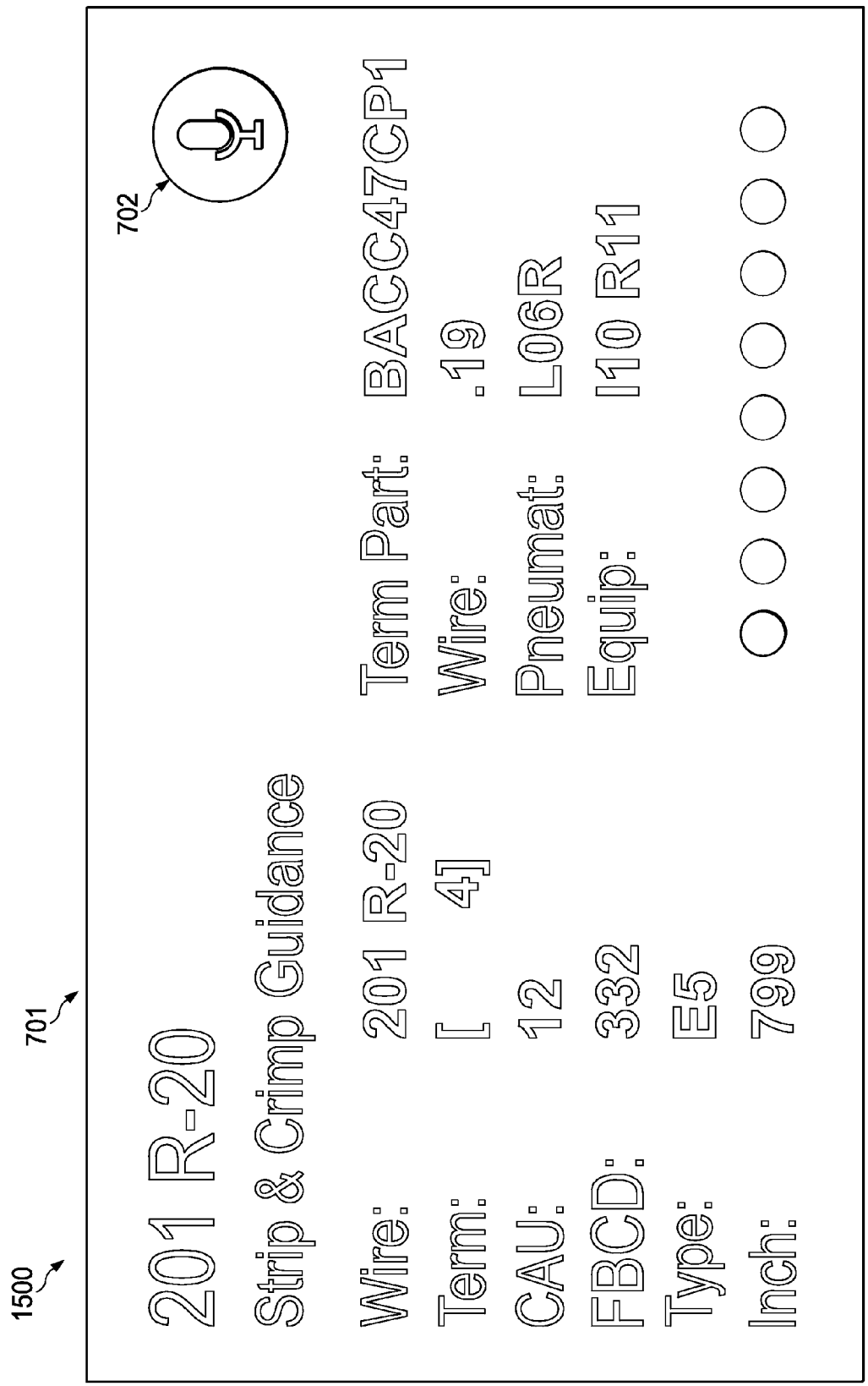
FIG. 15 is an illustration of a view of a user interface of a mobile application that could be displayed using a display system in accordance with an illustrative embodiment.

Turning now to FIG. 15, an illustration of a view of a user interface of a mobile application that could be displayed using a display system is depicted in accordance with an illustrative embodiment. View 1500 may be another image of mobile application 701. View 1500 may be displayed if strip & crimp 1108 is selected in view 1100 of FIG. 11. Strip and crimp tasks on wires may be performed prior to inserting the wires into a plug. As a result, in some illustrative examples, view 1500 may be instructions for a wire in plug map 1202. In these illustrative examples, view 1500 may be displayed prior to view 1100. In other illustrative examples, view 1500 may be instructions for a wire in a different plug than that in plug map 1202. In these illustrative examples, view 1500 may be displayed either before or after view 1100.

Figure 16:
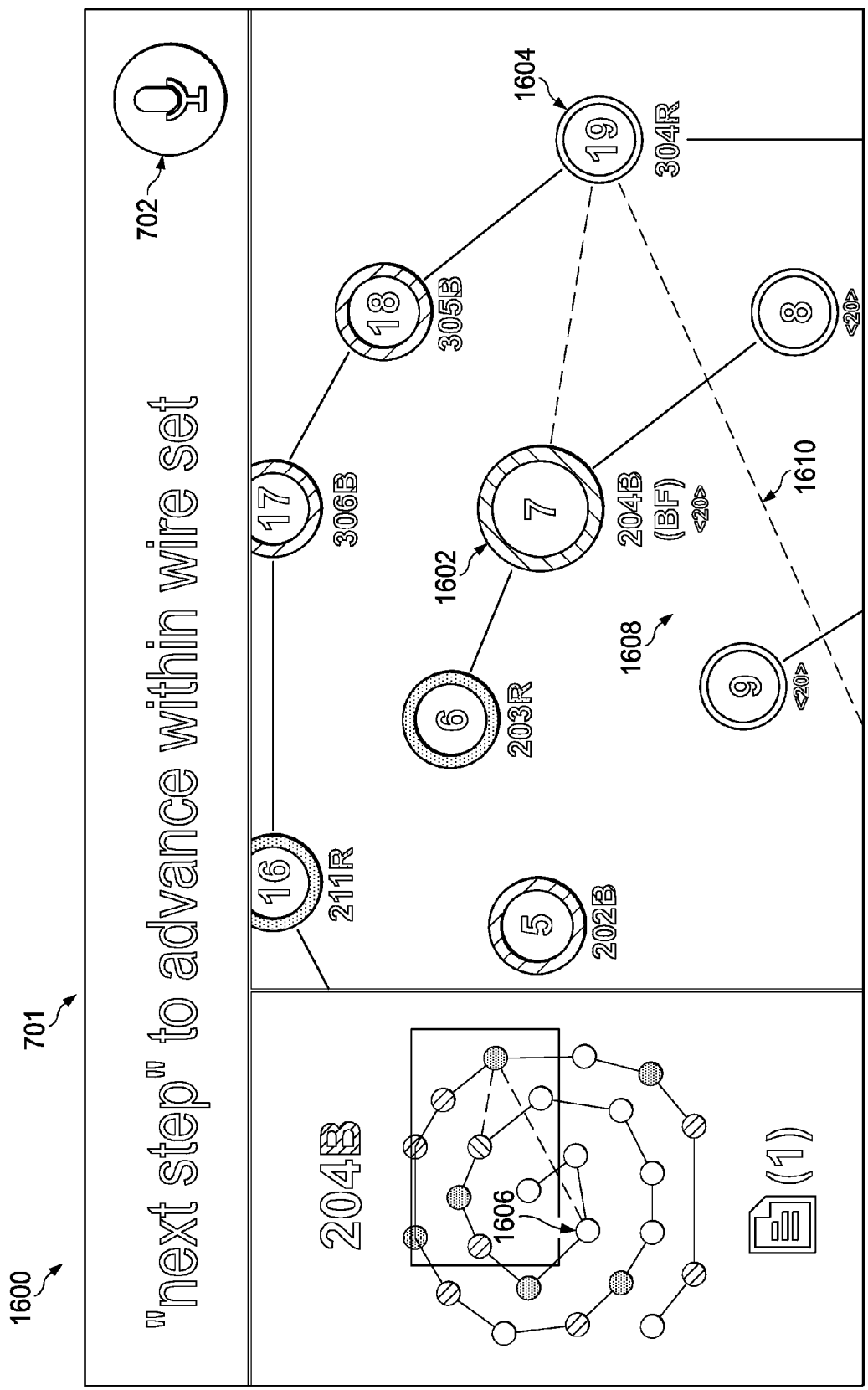
FIG. 16 is an illustration of a view of a user interface of a mobile application that could be displayed using a display system in accordance with an illustrative embodiment.

Turning now to FIG. 16, an illustration of a view of a user interface of a mobile application that could be displayed using a display system is depicted in accordance with an illustrative embodiment. View 1600 may be another image of mobile application 701. View 1600 may be an image displayed after view 1200 of FIG. 12. View 1600 may be a view of plug map 1202. View 1600 may be an implementation of view 1300 in which some of the wires are a set of wires. In this illustrative example, wires to be inserted into opening 1602, opening 1604, and opening 1606 may be a set of wires. Connections 1608 indicate that selected wire 1308 is part of a set of wires. As depicted, connections 1608 are dotted lines 1610.

Figure 17:
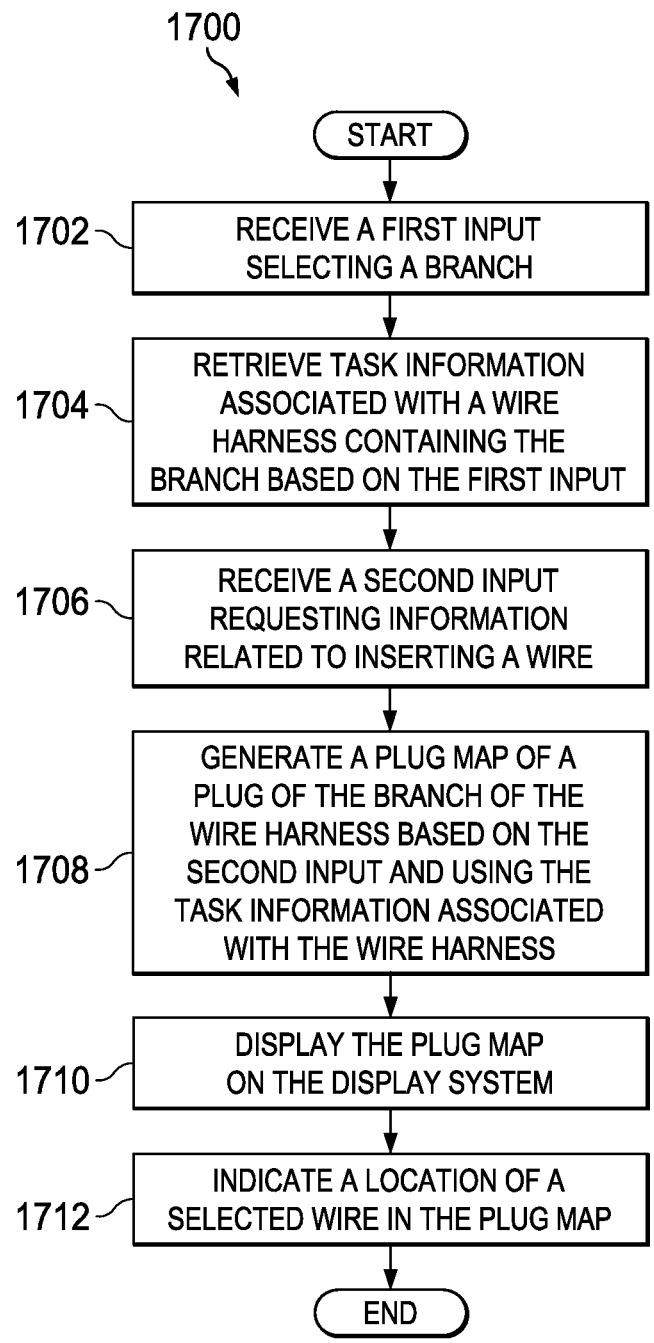
FIG. 17 is an illustration of a flowchart of a process for displaying an image using an augmented reality vision system in accordance with an illustrative embodiment.

Turning now to FIG. 17, an illustration of a flowchart of a process for displaying an image using an augmented reality vision system is depicted in accordance with an illustrative embodiment. Process 1700 may be a process for displaying image 514 on display system 508 of FIG. 5. In some illustrative examples, process 1700 may be used in wire harness assembly environment 200 of FIG. 2.

Process 1700 receives a first input selecting a branch (operation 1702). The first input may take the form of a verbal command, a tap, or a swipe. A verbal command may be inputted using a microphone or other desirable voice input device. The tap or swipe may be detected by a touch pad.

Task information associated with a wire harness containing the branch is retrieved based on the first input (operation 1704). In some illustrative examples, the task information may be retrieved from a database in a computer system. The computer system may be separate from the display system. In some illustrative examples, the task information is retrieved from within a processor of the display system to be used by a mobile application run on the processor.

A second input requesting information related to inserting a wire is received (operation 1706). The second input may be in response to an image of the mobile application requesting additional input.

A plug map is generated of a plug of the branch of the wire harness based on the second input and using the task information associated with the wire harness (operation 1708). The plug map may indicate a number of openings. Wires may be placed within the number of openings.

The plug map is displayed on the display system (operation 1710). The plug map may be displayed as an image in a viewing area of the display system.

A location of a selected wire is indicated in the plug map (operation 1712). Afterwards the process terminates. The selected wire may be selected by the mobile application or by the user. The selected wire may be indicated using a color or a fill.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Further, some blocks may not be implemented.

For example, process 1700 may also generate a number of connections between the selected wire and a number of wires in the plug map. The number of connections may indicate when the wires are part of a set of wires.

In some illustrative examples, process 1700 may also indicate the selected wire has been completed in response to receiving a third input, and indicate a location of a next wire in the number of wires after indicating the selected wire has been completed. Indicating the wire has been completed may be done through at least one of flashing, changes of color, changes of shading, icons, or other desirable methods in the plug map.

In some illustrative examples, process 1700 may also display strip and crimp information for the selected wire prior to displaying the plug map. The strip and crimp information may include at least one of a wire type, a wire length, or a tool type.

In some illustrative examples, process 1700 may also create a recommended order of installation for wires into the plug of the branch of the wire harness based on a knowledge base. The knowledge base may include information 530 stored in database 526. The order of installation for wires may increase efficiency, increase the ease of installation, or otherwise desirably influence installation of the wires.

In some illustrative examples, process 1700 may also scan a code to identify a shop order. In these examples, retrieving the task information associated with the wire harness may be based on the code.

Figure 18:
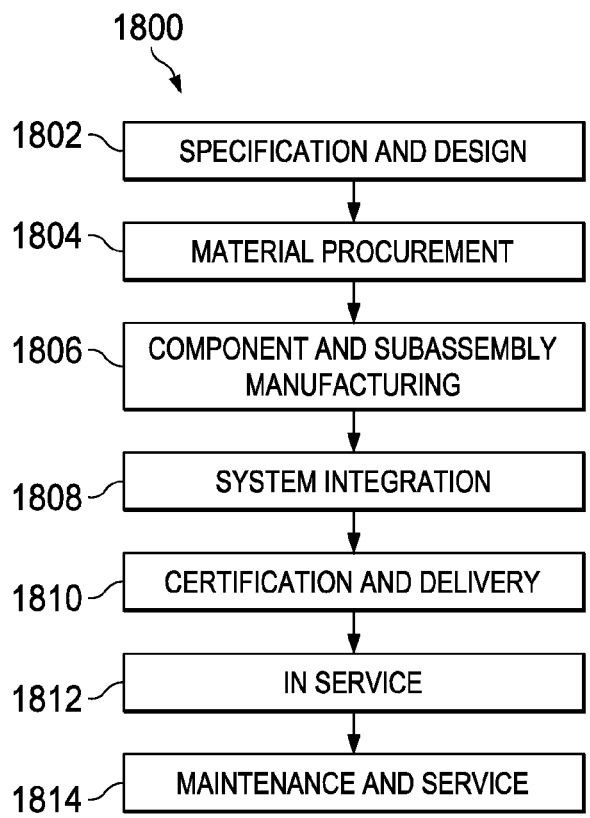
FIG. 18 is an illustration of an aircraft manufacturing and service method in accordance with an illustrative embodiment.

The illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in accordance with an illustrative embodiment. During preproduction, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1800 in FIG. 18. One or more illustrative embodiments may be used during component and subassembly manufacturing 1806. For example, display system 508 of FIG. 5 may be used to form wire harness 506 during component and subassembly manufacturing 1806.

The apparatus and method presented may increase the efficiency of performing tasks on wire harnesses. Unlike reviewing conventional paper instructions, an operator may not need to put the wire harness down to view instructions on augmented reality glasses having a mobile application. Thus, an operator may perform different tasks on a wire harness more efficiently through the use of augmented reality glasses. Further, an operator may not need to look down or away from the wire harness to see an image generated by a mobile application. Yet further, by using a mobile application in augmented reality glasses, notes and image data may be recorded during performance of a number of tasks on the wire harness. These notes and image data may be recorded without the operator having to look down or stop performing tasks on the wire harness.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An augmented reality vision system for a wire harness assembly environment, the augmented reality vision system comprising:
    a display system having a viewing area configured to display an image, wherein the display system is head-mounted; and
    a processor running a mobile application to provide data regarding the wire harness, in which the mobile application receives a first input selecting a branch, retrieves task information associated with the wire harness containing the branch based on the first input, receives a second input requesting information related to inserting a wire, generates a plug map of a plug of the branch of the wire harness based on the second input and using the task information associated with the wire harness, displays the plug map on the display system, and indicates a location of a selected wire in the plug map, wherein the mobile application is further configured to generate video data of a combination of a display of the plug map on the display system and live video feed of the wire harness, and wherein the mobile application is further configured to provide the video data to a second display system viewable by a second person other than a first person forming the wire harness.

2. The augmented reality vision system of claim 1 further comprising:
    a computer system configured to send the task information regarding the wire harness to the display system to display on the display system.

3. The augmented reality vision system of claim 2, wherein the camera system is configured to generate image data related to a number of tasks performed in the wire harness assembly environment.

4. The augmented reality vision system of claim 2, wherein the camera system is configured to capture an image of an indicator of a shop order.

5. The augmented reality vision system of claim 1, wherein the mobile application is further configured to generate a record of operations of tasks performed while forming the wire assembly.

6. The augmented reality vision system of claim 1 further comprising:
    an input device associated with the display system, and is configured to receive the first input, wherein the input device is a touch pad.

7. The augmented reality vision system of claim 1, wherein the mobile application uses additional input from a camera system to verify that the wire has been inserted, and wherein the mobile application additionally prevents display of a subsequent task to be performed with respect to the wire assembly until inserting the wire has been verified as being completed correctly.

8. The augmented reality vision system of claim 1, wherein the mobile application further provides, simultaneously with a display of the plug map on the display system, a second display of instructions and checklists associated with forming the wire harness on the display system.

9. An augmented reality vision system for a wire harness manufacturing environment, the augmented reality vision system comprising:
   a display system having a viewing area that is substantially transparent, wherein the viewing area is configured to display an image, wherein the display system takes the form of augmented reality glasses;
   an input device associated with the display system, wherein the input device is configured to receive at least one of a first input or a second input;
   a camera system associated with the display system; and
   a processor associated with the display system and running a mobile application to provide data regarding the wire harness in which the mobile application receives the first input selecting a branch, retrieves task information associated with the wire harness containing the branch based on the first input, receives the second input requesting information related to inserting a wire, generates a plug map of a plug of the branch of the wire harness based on the second input and using the task information associated with the wire harness, displays the plug map on the display system, and indicates a location of a selected wire in the plug map, and wherein the mobile application is further configured to generate a record of operations of tasks performed while forming the wire assembly.

10. A method of displaying an image using an augmented reality vision system, the method comprising:
   receiving a first input selecting a branch;
   retrieving task information associated with a task regarding a wire harness containing the branch based on the first input;
   receiving a second input requesting information related to inserting a wire;
   generating a plug map of a plug of the branch of the wire harness based on the second input and using the task information associated with the wire harness;
   displaying the plug map on a display system;
   indicating a location of a selected wire in the plug map;
   using the camera system to take a second image of the wire harness after the first task is performed;
   comparing the first image to the second image to form a comparison;
   verifying that the first task was completed correctly based on the comparison to form a verification;
   responsive to the verification indicating successful completion of the first task, displaying an indication that the first task was completed successfully;
   responsive to the verification indicating unsuccessful completion of the first task, displaying an alert that the first task was not completed successfully; and
   preventing display of a second task to be performed with respect to the wire assembly until the first task is completed successfully.

11. The method of claim 10, wherein the augmented reality vision system comprises augmented reality glasses, and wherein retrieving the task information is performed by retrieving the task information from a data storage that is part of the augmented reality vision system.

12. The method of claim 11 further comprising:
   indicating the selected wire has been completed in response to receiving a third input; and
   indicating a location of a next wire in the number of wires after indicating the selected wire has been completed.

13. The method of claim 10, further comprising:
   receiving, from the second person via the communication device, assistance feedback that is based on the video data, the assistance feedback communicating assistance in forming the wire harness by the first person.

14. The method of claim 10 further comprising:
   displaying strip and crimp information related to the selected wire prior to displaying the plug map.

15. The method of claim 14, wherein the strip and crimp information includes at least one of a wire type, a wire length, or a tool type.

16. The method of claim 10 further comprising:
   creating a recommended order of installation of the wires into the plug of the branch of the wire harness based on a knowledge base.

17. The method of claim 10, further comprising:
   generating, by the augmented reality vision system, video data of a combination of a display of the plug map on the display system and live video feed of the wire harness; and
   communicating, via a communication device that is part of the augmented reality vision system, the video data to a second display system viewable by a second person other than a first person forming the wire harness while using the augmented reality vision system.

18. The augmented reality vision system of claim 9, wherein the record of operations include image data taken by the camera system representing what is seen on the display system.

19. The augmented reality vision system of claim 9, wherein augmented reality system further comprises:
   a microphone that is part of the augmented reality glasses, and wherein the record of operations include notes recorded by voice input captured by the microphone.

20. The augmented reality vision system of claim 9, wherein the record of operations include image data taken by the camera system representing what is seen on the display system, and wherein augmented reality system further comprises:
   a microphone that is part of the augmented reality glasses, wherein the record of operations further includes notes recorded by voice input captured by the microphone; and
   a communication system that is part of the augmented reality glasses, the communication system configured to transmit the image data and the notes to a second display system for display to a second user.

21. A method of displaying an image using an augmented reality vision system, the method comprising:
   receiving a first input selecting a branch;
   retrieving task information associated with a task regarding a wire harness containing the branch based on the first input;
   receiving a second input requesting information related to inserting a wire;
   generating a plug map of a plug of the branch of the wire harness based on the second input and using the task information associated with the wire harness;
   displaying the plug map on a display system;
   indicating a location of a selected wire in the plug map;
   using the camera system to take a second image of the wire harness after the first task is performed;
   comparing the first image to the second image to form a comparison;

verifying that the first task was completed correctly based on the comparison to form a verification;

responsive to the verification indicating successful completion of the first task, displaying an indication that the first task was completed successfully;

responsive to the verification indicating unsuccessful completion of the first task, displaying an alert that the first task was not completed successfully;

preventing display of a second task to be performed with respect to the wire assembly until the first task is completed successfully;

generating a record of operations of tasks performed while forming the wire assembly;

generating video data of a combination of a display of the plug map on the display system and live video feed of the wire harness;

providing the video data to a second display system viewable by a second person other than a first person forming the wire harness; and receiving, from the second person via the communication device, assistance feedback that is based on the video data, the assistance feedback communicating assistance in completing the first task by the first person.

\* \* \* \* \*

UNITED STATES PATENT AND TRADEMARK OFFICE
CERTIFICATE OF CORRECTION

PATENT NO. : 9,589,390 B2
APPLICATION NO. : 14/711294
DATED : March 7, 2017
INVENTOR(S) : DeStories et al.

Page 1 of 1

It is certified that error appears in the above-identified patent and that said Letters Patent is hereby corrected as shown below:

In the Claims

Column 18, Line 46, Claim 3 change "the camera" to -- a camera --
    Line 50, Claim 4 change "the camera" to -- a camera --

Column 19, Line 45, Claim 10 change "the camera" to -- a camera --
    Line 46, Claim 10 change "the first task" to -- a first task --
    Line 47, Claim 10 change "the first image" to -- a first image --
    Line 49, Claim 10 change "the first task" to -- the task --

Column 20, Line 1, Claim 12 change "the number" to -- a number --
    Line 4, Claim 13 change "the second person via the communication" to
        -- a second person via a communication --
    Line 5, Claim 13 change "on the video" to -- on video --
    Line 7, Claim 13 change "the first person." to -- a first person. --

Signed and Sealed this
Twenty-seventh Day of February, 2018

Andrei Iancu
*Director of the United States Patent and Trademark Office*